(12) United States Patent
Nishikawa et al.

(10) Patent No.: US 6,547,451 B1
(45) Date of Patent: Apr. 15, 2003

(54) OPTICAL COMMUNICATIONS MODULE AND METHOD FOR MOUNTING OPTICAL COMMUNICATIONS MODULE

(75) Inventors: Tohru Nishikawa, Osaka (JP); Tomoaki Uno, Hyogo (JP); Masahiro Mitsuda, Kyoto (JP); Yasuhiro Kobayashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/457,554

(22) Filed: Dec. 9, 1999

(30) Foreign Application Priority Data

Dec. 9, 1998  (JP) .......................................... 10-350587

(51) Int. Cl.⁷ ................................................ G02B 6/36
(52) U.S. Cl. ........................... 385/88; 385/89; 385/92; 359/152
(58) Field of Search ................... 385/49, 14, 88–94; 359/152

(56) References Cited

U.S. PATENT DOCUMENTS

| | | | | |
|---|---|---|---|---|
| 5,771,254 A | * | 6/1998 | Baldwin et al. ............... | 372/31 |
| 5,841,562 A | * | 11/1998 | Rangwala et al. ........... | 359/152 |
| 5,867,622 A | * | 2/1999 | Miyasaka et al. ............. | 385/88 |
| 6,264,377 B1 | * | 7/2001 | Mitsuda et al. ................ | 385/88 |
| 6,334,716 B1 | * | 1/2002 | Ojima et al. ................... | 385/89 |
| 6,374,021 B1 | * | 4/2002 | Nakanishi et al. ............ | 385/49 |

OTHER PUBLICATIONS

Y. Yamada, et al., "Filter–Type WDM Transceiver Optical Circuit Using PLC Platform", from the proceedings of the Institute of Electronics Information and Communication Engineers Conference in Japan, 1996, SC–2–5, pp. 439–440.

* cited by examiner

*Primary Examiner*—Hemang Sanghavi
(74) *Attorney, Agent, or Firm*—Snell & Wilmer, LLP

(57) ABSTRACT

An optical communications Module for use in an optical transfer system for bidirectionally transferring a light signal through an optical fiber, the optical communications module having a light signal transmission capability, wherein the optical communications module includes: a semiconductor laser; an optical fiber coupled to a front facet of the semiconductor laser; a light splitting element for splitting light which is emitted from the front facet of the semiconductor laser and propagated within the optical fiber; and, an output-monitoring photodiode for receiving a portion of the light which has been split by the light splitting element as monitoring light, and generating a photocurrent based on the monitoring light, the photocurrent being used for controlling optical output of the semiconductor laser.

29 Claims, 13 Drawing Sheets

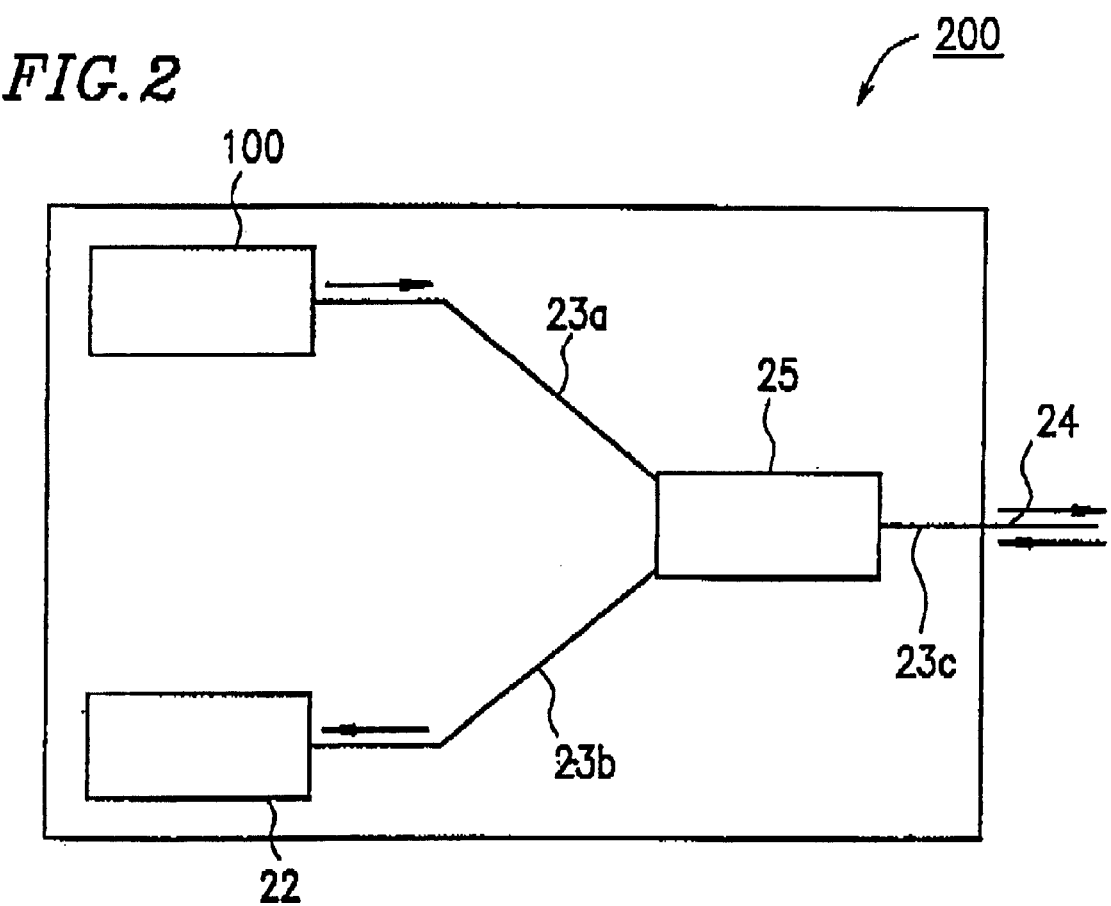

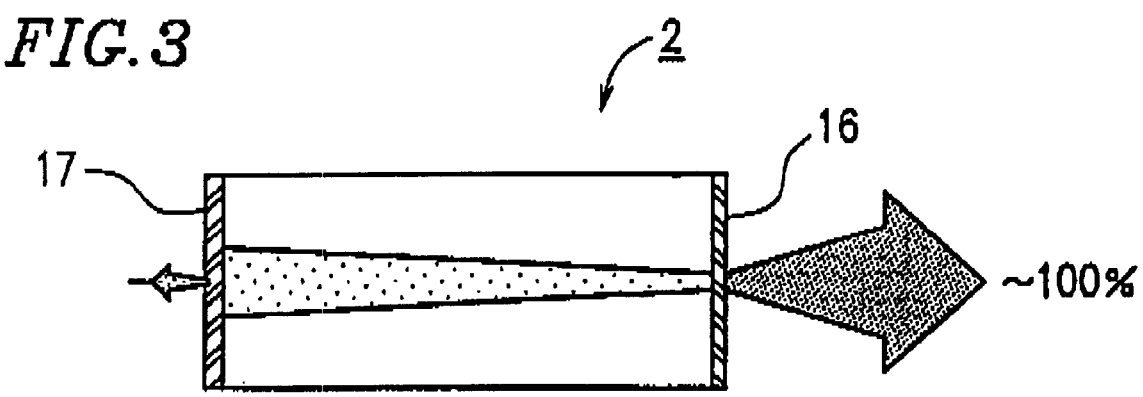
FIG.3 ~100%

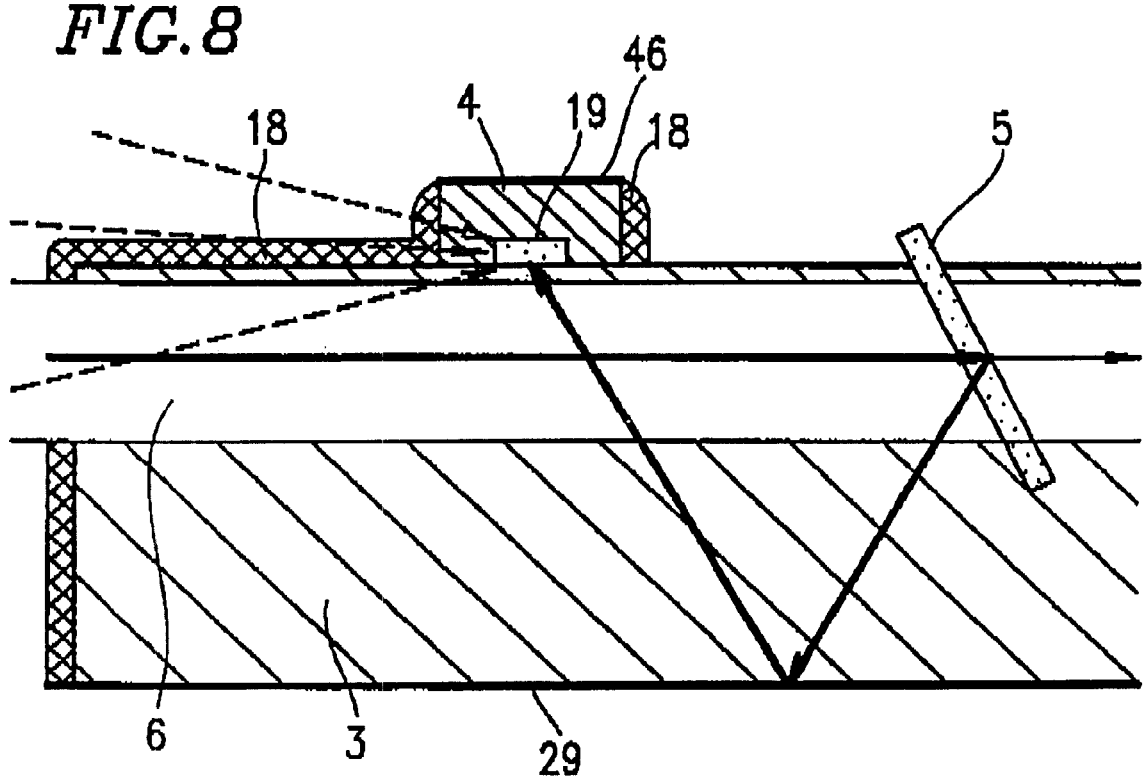

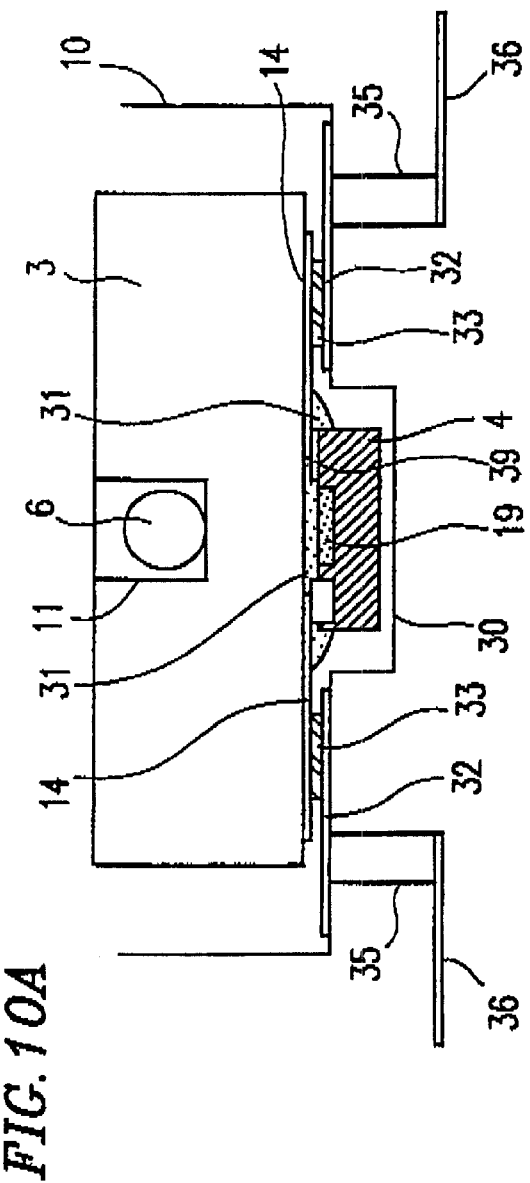

OPTICAL COMMUNICATIONS MODULE AND METHOD FOR MOUNTING OPTICAL COMMUNICATIONS MODULE

BACKGROUND OF THE INVENTION

1. Field of the Invention

The present invention relates to an optical communications module for use in an optical transfer system for bidirectionally transferring a light signal through an optical fiber, the optical communications module having a light signal transmission capability or a light signal transmission/reaction capability; and a method for mounting an optical communications module. More particularly, the present invention relates to an optical communications module capable of utilizing a portion of light which is emitted from a front facet of a semiconductor laser device and is coupled to an optical fiber as monitor light so as to generate an optical output control signal; and a method for mounting such an optical communications module.

2. Description of the Related Art

In recent years, there have been proposed various optical subscriber network systems for transferring multi-channel video information and/or data from a central station to households, and ways for putting such systems to practical use have been studied. Such a system requires each household to install a plurality of optical reception modules as well as an optical transmission module having a light emission capability or a light emission/reception capability. A plurality of optical reception modules are necessary for simultaneously receiving different types of light signals which are transmitted across a wavelength division multiplexing optical network system. Therefore, there is always desired a cheaper and higher-performance optical reception module. On the other hand, an optical transmission module is necessary for transmitting requests and/or data from each household to the central station. Therefore, there is always desired a cheaper, smaller, and yet higher-performance optical transmission module.

Furthermore, an optical communications module for use in such systems, having a light signal transmission capability or a light signal transmission/reception capability, needs to be designed so as to be installable in any desired place. Specifically, an optical communications module to required to have excellent temperature characteristics for greater flexibility in the selection of installation locations. In particular, the tracking error characteristics with respect to optical output are very important to the stable transmission of signals.

An example of an optical transmission/reception apparatus for the aforementioned purposes is disclosed in the proceedings of the Institute of Electronics, Information and Communication Engineers Spring Conference in Japan, 1997, SC-3—3. FIG. 13 is a plan view showing an optical transmission/reception apparatus 800.

First, the structure of the optical transmission/reception apparatus 800 is described. At a common port 88 and an output port 89 on a PLC (Planar Lightwave Circuit) substrate 81, external transfer paths (optical fibers) 90a and 90b are coupled to PLC waveguides 91a and 91b, respectively. The external transfer paths 90a and 90b are disposed in a fiber connection block 87. At a WDM (wavelength division multiplexing) filter 85, the PLC waveguides 91a and 91b are combined into a PLC waveguide 91c, which is again split into PLC waveguides 91d and 91e at a Y-juncture 86. The PLC waveguides 91d and 91e are coupled to, respectively, a photodiode element 83 for a 1.3 $\mu$m wavelength band and a semiconductor laser device 52 for a 1.3 $\mu$m wavelength band. According to this technique, the semiconductor laser device 82 is equivalent to an optical communications module having a transmission capability, and the photodiode device 83 is equivalent to an optical reception module. Behind the semiconductor laser device 82, a waveguide-type photodiode 84 for optical output monitoring purposes is provided on the PLC substrate 81. The conventional optical transmission/reception apparatus 800 is thus constructed.

The optical transmission/reception apparatus 800 receives light in the following manner: First, multiplexed light including a 1.3 $\mu$m wavelength component and a 1.55 $\mu$m wavelength component is input from the external transfer path 90a to the common port 88. Among the two light components, the light component of the 1.55 $\mu$m wavelength band is reflected by the WDM filter 85 so as to be output to the external transfer path 90b via the output port 89. The other light component of the 1.3 $\mu$m wavelength band is transmitted through the WDM filter. 85 and split at the Y-juncture 86 so as to be received by the photodiode device 83 for the 1.3 $\mu$m wavelength band.

The optical transmission/reception apparatus 800 transmits light in the following manner: The light which is emitted from the front facet of the semiconductor laser device 82 for the 1.3 $\mu$m wavelength band (which is a transmission light source) is optically coupled, without using any lens system, into the PLC waveguide 91e and propagated therethrough. This light undergoes an attenuation at the Y-juncture 86 in accordance with its branching ratio, and thereafter is propagated through the PLC waveguide 91a. Next, this light is transmitted through the WDM filter 85 and output to the external transfer path 90a via the common port 88.

Herein, the "front facet" of the semiconductor laser device 82 refers to a face which is optically coupled to the waveguide 91e. A "rear facet" refers to the opposite facet of the semiconductor laser device 82.

The above-described configuration of the conventional optical transmission/reception apparatus 800 is suitable for surface mounting, utilizing passive alignment, except for the junction portions between the external transfer paths (optic fibers) 90a and 90b and the common port 88 and the output port 89 on the PLC substrate 81.

In accordance with the conventional optical transmission/reception apparatus 800 shown in FIG. 13, a signal which is utilized for optical output control is obtained by the use of the optical output-monitoring waveguide-type photodiode 84. Specifically, the light which is emitted from the rear facet of the semiconductor laser device 82 is received by the optical output-monitoring waveguide-type photodiode 84, and a photocurrent which is generated responsive to the received light is utilized as a signal for optical output control.

In accordance with the conventional optical transmission/reception apparatus 800, it may be difficult to equalize the temperature characteristics (front facet temperature characteristics) of the coupling efficiency between the semiconductor laser device 82 and the PLC waveguide 91e with the temperature characteristics (rear facet temperature characteristics) of the light-current conversion efficiency of the optical output-monitoring waveguide-type photodiode 84 receiving the light which is emitted from the rear facet of the semiconductor laser device 82. This may lead to deterioration in the tracking error characteristics.

Examples of semiconductor laser devices for use in the above-described class of optical communications modules include spot size conversion laser devices and narrow divergence angle laser devices. In general, the radiation angle of laser light which is provided by a semiconductor laser device is known to have some dependency on the temperature of the semiconductor laser device. Furthermore, the radiation angle-temperature characteristics of the laser light which is emitted from the front facet of a semiconductor laser device (hereinafter referred to as the "radiation angle-temperature characteristics on the front facet") may have discrepancies with the radiation angle-temperature characteristics of the laser light which is emitted from the rear facet of the semiconductor laser device (hereinafter referred to as the "radiation angle-temperature characteristics on the rear facet"). In particular, semiconductor laser devices such as narrow divergence angle laser devices, which provide an enlarged spot size by employing an active layer having a tapered configuration, are likely to have some discrepancies between the respective radiation angle-temperature characteristics on the front facet and the rear facet in a relatively wide range of temperatures, e.g., about −40° C. to about 85° C. In the case of conventional optical transmission/reception apparatus which utilizes the light emitted from the front facet as a transmission signal and which utilizes the light emitted from the rear facet as an optical output control signal (serving as monitoring light) for the semiconductor laser device, any substantial discrepancies between the respective radiation angle-temperature characteristics on the front facet and the rear facet will make it difficult to accurately monitor the optical output of the light emitted from the front facet of the device based on the light emitted from the rear facet of the device. Thus, discrepancies between the respective radiation angle-temperature characteristics on the front facet and the rear facet can be another cause for deterioration in the tracking error characteristics of the conventional optical transmission/reception apparatus 800.

In the case where multiple reflection occurs between the front facet of the semiconductor laser device and the facet of a waveguide or optical fiber, the semiconductor laser device may undergo a so-called mode hopping, so that the coupling efficiency with the waveguide or optical fiber may vary greatly, resulting in severe deterioration in the tracking error characteristics.

In order to prevent mode hopping from occurring, the conventional optical transmission/reception apparatus 800 is typically required to incorporate an antireflective film which is provided on the facet of the optical output-monitoring waveguide-type photodiode 84 adjacent to the semiconductor laser device 82, thereby preventing reflected light from returning to the semiconductor laser device 82.

In general, the mounting margin for the waveguide-type photodiode 84 with respect to the semiconductor laser device 82 is an the order of 5 μm. This margin, which is extremely small relative to the mounting margin for photodiodes of a surface incidence type, is one cause for the relatively high mounting cost in the conventional structure.

Furthermore, as described above, the conventional optical transmission/reception apparatus 800 incorporates a PLC substrate 81 as an optical circuit. In the case where a PLC substrate (e.g., a PLC substrate of a silica type) is used, the chip size will be constrained by the minimum beding radius of the waveguide, as described in more detail below.

A given PLC waveguide has associated therewith a minimum beding radius above which the PLC waveguide does not incur any loss due to the difference in refractive index between the waveguide layer and the cladding layer. The minimum beding radius can be reduced by increasing the difference in refractive index between the waveguide layer and the cladding layer. For example, the minimum boding radius can be reduced to about 5 mm by increasing the aforementioned difference in refractive index to about 0.75%. However, the minimum boding radius cannot be further decreased from about 5 mm because the aforementioned difference in refractive index must not exceed 0.75%, which marks a practically maximum value in terms of internal loss within the waveguide and coupling loss with the optical fiber. It is generally understood that this constraint on the minimum beding radius is a cause for a long module size along the direction of light propagation, which hinders the downsizing of the module.

In the case of a bi-directional optical communications module 800 as shown in FIG. 13, which includes the fiber connection block 87 as well as the PLC portion, the size (the length along the optical axis direction) of the PLC portion alone measures at least about 15 mm. Hence, the size (the length along the optical axis direction) of the entire optical transmission/reception apparatus must at least be about 20 mm, including the fiber connection block 87 as well as the PLC portion.

SUMMARY OF THE INVENTION

According to the present invention, there is provided an optical communications module for use in an optical transfer system for bidirectionally transferring a light signal through an optical fiber, the optical communications module having a light signal transmission capability, wherein the optical communications module includes: a semiconductor laser; an optical fiber coupled to a front facet of the semiconductor laser; a light splitting element for splitting light which is emitted from the front facet of the semiconductor laser and propagated within the optical fiber: and an output-monitoring photodiode for receiving a portion of the light which has been split by the light splitting element as monitoring light, and generating a photocurrent based on the monitoring light, the photocurrent being used for controlling optical output of the semiconductor laser.

In an embodiment of the invention, the optical communications module further including a high reflectance film on a rear facet of the semiconductor laser.

In another embodiment of the invention, the semiconductor laser is a laser device selected from a group comprising narrow divergence angle laser devices and spot size conversion laser devices.

In still another embodiment of the invention, the semiconductor laser comprises a DFB laser device.

In still another embodiment of the invention, the semiconductor laser is a high power laser device for use as a pump light source.

In still another embodiment of the invention, the optical communications module further includes an optical fiber-embedding type optical circuit, the optical fiber-embedding type optical circuit having the optical fiber being embedded in an optical fiber-embedding substrate.

In still another embodiment of the invention, the light splitting element comprises a half mirror which is inserted in the optical fiber-embedding substrate at an angle with respect to a central axis of the optical fiber, the half mirror lying in an optical path within the optical fiber.

In still another embodiment of the invention, the optical communications module further including: a reception photodiode mounted on an upper face of the optical fiber-embedding substrate; and a metal total reflection film provided on a bottom face of the optical fiber-embedding substrate, wherein the output-monitoring photodiode is mounted on the upper face of the optical fiber-embedding substrate, and wherein an external light signal propagated through the optical fiber is reflected from the half mirror so as to be received by the reception photodiode, and the monitoring light is reflected by the half mirror and the metal total reflection film so as to be received by the output-monitoring photodiode, whereby the optical communications module has an optical signal transmission/reception capability.

In still another embodiment of the invention, the optical communications module further including a reception photodiode mounted on an upper face of the optical fiber-embedding substrate, wherein the output-monitoring photodiode is mounted on a bottom face of the optical fiber-embedding substrate, and wherein an external light signal propagated through the optical fiber is reflected from the half mirror so as to be received by the reception photodiode, and the monitoring light is reflected by the half mirror so as to be received by the output-monitoring photodiode, whereby the optical communications module has an optical signal transmission/reception capability.

In still another embodiment of the invention, the output-monitoring photodiode is mounted on an upper face of the optical fiber-embedding substrate, and wherein the monitoring light is reflected by the half mirror so as to be received by the output-monitoring photodiode, and wherein the half mirror has a reflectance in a range of about 5% to about 15% with respect to an emission wavelength of the semiconductor laser.

In still another embodiment of the invention, an interspace between the optical fiber-embedding substrate and a light-receiving face of the output-monitoring photodiode is substantially filled with a resin whose refractive index is matched with a refractive index of a material composing the fiber embedding substrate.

In still another embodiment of the invention, the optical communications module further includes an antireflective film with respect to an emission wavelength of the semiconductor laser in a light-incidence region of a light-incidence face of the output-monitoring photodiode.

In still another embodiment of the invention, the optical communications module further includes a metal light-shielding film on a surface of the output-monitoring photodiode in regions except for a light-receiving region and a light-incidence region for allowing incident light to pass through.

In still another embodiment of the invention, the optical communications module further includes a light-shielding resin substantially covering facets other than an upper face and a bottom face of the output-monitoring photodiode.

In still another embodiment of the invention, wherein the optical communications module is mounted in a package, and wherein the output-monitoring photodiode mounted on the bottom face of the optical fiber-embedding substrate is located within a concavity formed in a bottom face of the package.

Thus, the invention described herein makes possible the advantages of (1) providing a low-cost, compact, and high-performance optical communications module having improved tracking error characteristics; and (2) a method for such an optical communications module.

These and other advantages of the present invention will become apparent to those skilled in the art upon reading and understanding the following detailed description with reference to the accompanying figures.

BRIEF DESCRIPTION OF THE DRAWINGS

FIG. 2 shows an optical transmission/reception apparatus incorporating the optical communications module according to Example 1 of the present invention.

FIG. 3 is a plan view showing a semiconductor laser device for use in the optical communications module according to the present invention.

FIG. 8 is a cross-sectional view illustrating a method for blocking noise light in the optical communications module according to Example 2 of the present invention.

FIG. 10A is a cross-sectional view, taken along line A—A' in FIGS. 9A to 9C, showing an optical communications module according to Example 3 of the present invention incorporating a face-down type output-monitoring photodiode.

FIG. 10B is a cross-sectional view, taken along line A—A' in FIGS. 9A to 9C, showing an optical communications module according to Example 3 of the present invention incorporating a face-up type output-monitoring photodiode.

DESCRIPTION OF THE PREFERRED EMBODIMENTS

Hereinafter, specific embodiments of the present invention will be described along with the effects attained by such embodiments, with reference to the accompanying drawings.

As used herein, a "front facet" of a semiconductor laser device refers to a face at which the semiconductor laser device is optically coupled to an optical fiber. A "rear facet" refers to the opposite facet to the front facet.

As used herein, a "proximal" end of an optical fiber refers to an end which is coupled to a semiconductor laser device in an optical communications module according to the present invention. A "distal" end refers to the opposite end of the optical fiber, which may be coupled to a main communications system or the like that is external to the present invention.

EXAMPLE 1

Figure 1A:
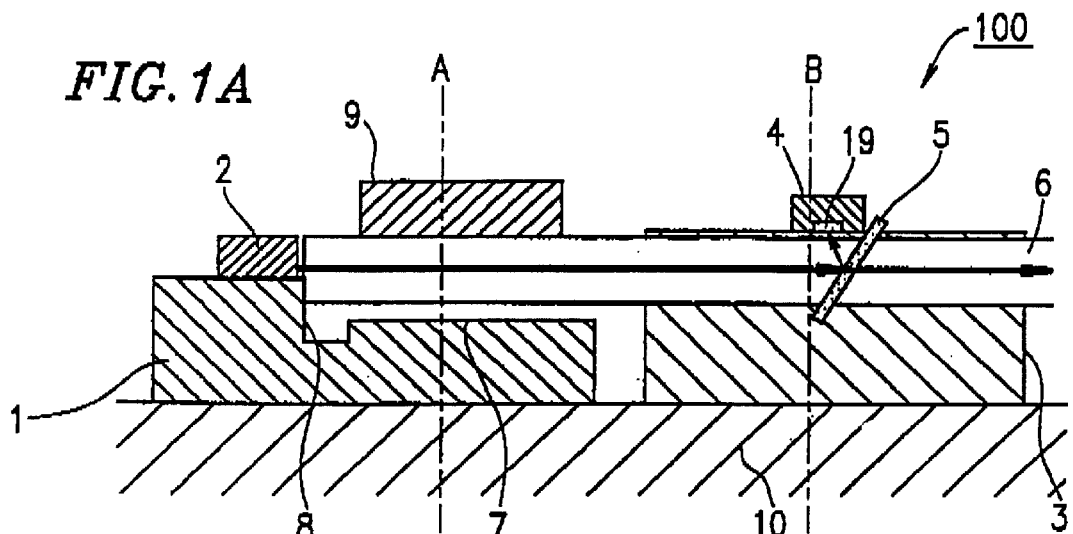
FIG. 1A is a cross-sectional view of an optical communications module according to Example 1 of the present invention, taken along line X—X' in FIG. 1B.
Figure 1B:
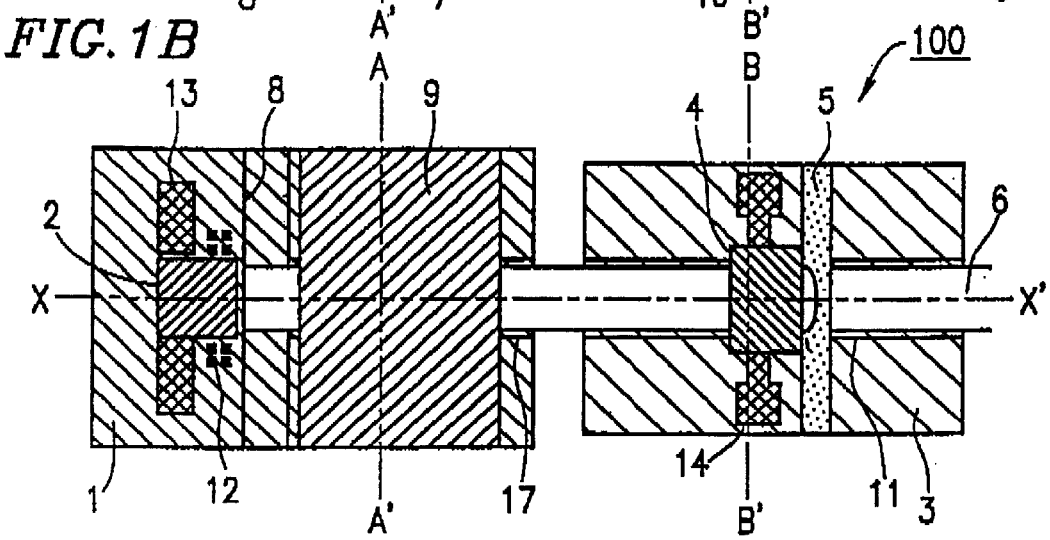
FIG. 1B is a plan view of the optical communications module shown in FIG. 1A.
Figure 1C:
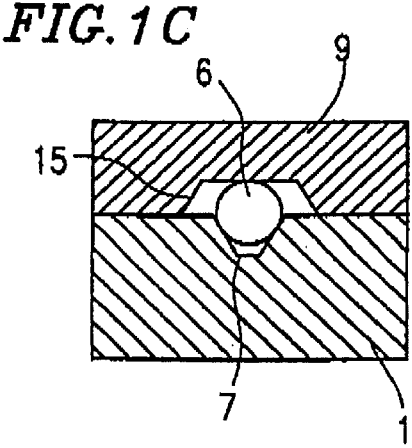
FIG. 1C is a cross-sectional view taken along line A—A' in FIG. 1A.
Figure 1D:
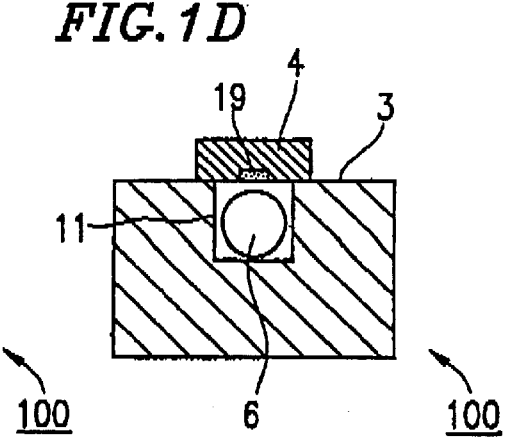
FIG. 1D is a cross-sectional view taken along line B—B, in FIG. 1B.

An optical communications module 100 according to Example 1 of the present invention will be described with reference to FIGS. 1A to 1D, 2, 3, 4A to 4D, 5A to 5D, and 6. FIG. 1A is a cross-sectional view of the optical communications module 100 taken along line X—X' in FIG. 1B. FIG. 1B is a plan view of the optical communications module 100. FIGS. 1C and 1D are cross-sectional views of the optical communications module 100 taken along line A—A' and line B—B', respectively, in FIGS. 1A and 1B. The thick arrows and the thin arrow In FIG. 1A represent the directions of propagation of signal light and monitor light, respectively. FIG. 2 shows an optical transmission/reception apparatus 200 incorporating the optical communications module 100 according to the present example.

The optical communications module 100 is a optical transmission module. As shown in FIG. 2, the optical transmission/reception apparatus 200 includes the optical communications module (optical transmission module) 100 and a optical reception module 22 provided. The optical communications module 100 and the optical reception module 22 are coupled to optical fibers 23a and 23b, respectively. The optical fibers 23a and 23b are coupled to an optical fiber 23a at a Y-juncture (which is a 3 dB coupler) 25, and the optical fiber 23a is coupled to an external transfer path 24. The principle of light propagation in the optical transmission/reception apparatus 200 according to the present example is similar to that of the aforementioned conventional optical transmission/reception apparatus 800, except that the optical communications module 100 has a structure which is distinct from that of the conventional optical transmission/reception apparatus 800. Hereinafter, the optical communications module 100 according to the present example will be specifically described.

As shown in FIGS. 1A and 1B, wiring patterns 13 and alignment markers 12 are formed on an Si substrate 1 which is provided on the inside of a bottom face 10 of the package. Furthermore, a semiconductor laser device 2 is mounted on the Si substrate 1. The semiconductor laser device 2 can be highly accurately positioned with respect to the Si substrate 1 through image recognition techniques utilizing the alignment markers 12.

As shown in FIG. 1C, an end portion of an optical fiber 6 is positioned with respect to the Si substrate 1, such that the optical fiber 6 is held between a V-groove 7 formed in the Si substrate 1 and a trapezoidal groove 15 formed in an optical fiber holder 9 to obtain tripartite support. Resin is used to bury the optical fiber 6 for fixation. Due to the tripartite support provided for the optical fiber 6, the optical fiber 6 can be positioned very accurately with respect to the Si substrate 1. The optical fiber 6 can also be highly accurately positioned along the optical axis direction by allowing the proximal facet of the optical fiber 6 to abut against an optical fiber stopper 8.

In this package, the optical communications module 100 further incorporates a quartz glass substrate 3 on the distal side of the Si substrate 1 (i.e., so as to be opposite from the semiconductor laser device 2). A groove (also herein referred to as a "fiber embedding groove") 11 for burying an optical fiber therein is formed in the upper face of the quartz glass substrate (also herein referred to as a "fiber embedding substrate") 3. A wiring pattern 14 is formed on the upper face of the quartz glass substrate 3 by machine cutting. As shown in FIG. 1D, the optical fiber 6 is placed in the fiber embedding groove 11, and affixed by being buried in resin. As shown in FIGS. 1A and 1B, a light splitting element 5, e.g., a half mirror, is inserted in the quartz glass substrate 3 at an angle of about 30° with respect to the central axis of the optical fiber 6. The half mirror 5 lies in the optical path within the optical fiber 6. A photodiode 4 (hereinafter referred to as the "output-monitoring photodiode 4") for optical output monitoring purposes is mounted on the upper face of the quartz glass substrate 3 astride the fiber embedding groove 11 for receiving monitoring light, i.e., the light which is reflected from the half mirror 5.

In accordance with the optical communications module 100 having the aforementioned structure, a portion of the light which has been emitted from the semiconductor laser device 2 and thereafter coupled into and propagated through the optical fiber 6 is reflected by the half mirror (light splitting element) 5, so as to be upwardly deflected toward the upper face of the quartz glass substrate 3. The reflected monitoring light is received by the output-monitoring photodiode 4 which can be accurately positioned on the upper face of the quartz glass substrate 3 as described later. The light which is received by the output-monitoring photodiode 4 generates a photocurrent which is utilized for controlling the optical output of the semiconductor laser device 2.

As will be appreciated by those skilled in the art, the light splitting element 5 is not limited to a half mirror. Any means which is capable of splitting light can be suitably employed.

The half mirror 5 preferably has a reflectance in the range of about 5% to about 15% with respect to the emission wavelength of the semiconductor laser device 2 in order to ensure that the output-monitoring photodiode 4 receives a sufficient amount of monitoring light (this point will be described later in more detail with reference to FIG. 11). For example, if the half mirror 5 has a reflectance of about 10%, a photocurrent of about 0.2 mA is expected to flow under the conditions that the output-monitoring photodiode 4 has a sensitivity of about 1 mA/mW and that the semiconductor laser device 2 provides an optical output power of about 2 mW. If the reflectance of the half mirror 5 is below about 5%, it becomes difficult to attain a sufficient sensitivity level of optical output monitoring. On the other hand, if the reflectance of the half mirror 5 exceeds about 15%, the loss of light amount due to the splitting of light becomes more than negligible. If the half mirror 5 has a reflectance in the range of about 5% to about 15%, the loss of light amount associated with optical output monitoring can be compensated for, and therefore rendered negligible, based on the principle described below.

According to the present invention, a portion of the optical output from the front facet of the semiconductor laser device 2 is utilized as monitoring light for monitoring the optical output of the semiconductor laser device 2. This eliminates the need for obtaining any optical output from the rear facet of the semiconductor laser device 2, as shown in FIG. 3. Therefore, a low reflectance film 16 and a high reflectance film 17, respectively, are coated on the front facet and the rear facet of the semiconductor laser device 2. The use of such coatings on the front and rear end faces of the semiconductor laser device 2 introduces an improvement of about 10% in the optical output power. The high reflectance film 17 on the rear facet of the semiconductor laser device 2 preferably has a reflectance of about 100% so that substantially 100% optical output power is obtained from the front facet of the semiconductor laser device 2. As a result, the lose of light amount due to the splitting of light by the half mirror 5 can be effectively compensated for by the high reflectance film 17 and the low reflectance film 16.

Figure 4A:
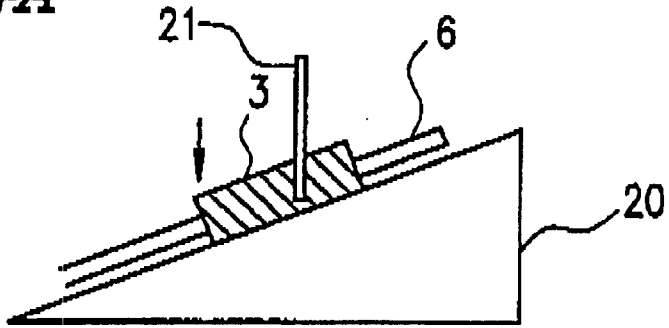
FIGS. 4A to 4D are cross-sectional views illustrating steps for providing a half mirror (light splitting element) in an optical communications module according to Example 1 of the present invention.
Figure 4B:
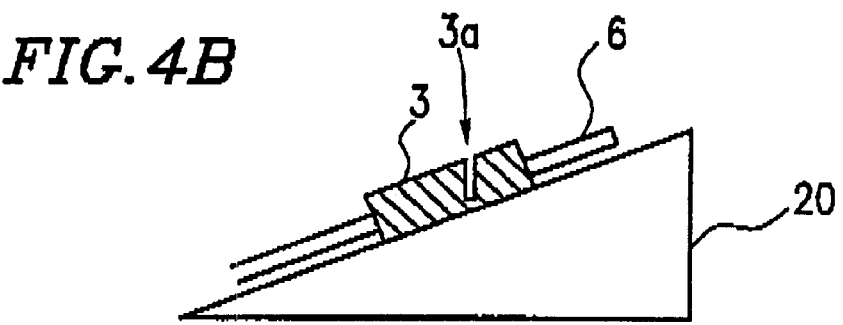
Figure 4C:
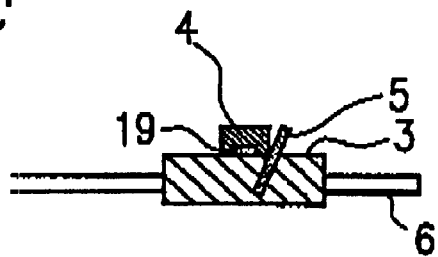
Figure 4D:
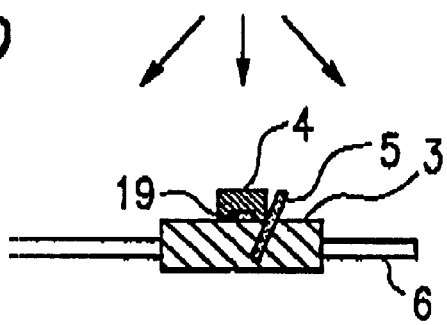

Now, a method for providing the half mirror 5 on the quartz glass substrate 3 is described in detail. With reference to FIG. 4A, the quartz glass substrate 3 is vacuum-adsorbed onto a base 20. The base 20 has a tilted surface which stands at an angle from the horizontal plane corresponding to the tilt angle of the half mirror 5 (i.e., the angle between the principal face of the half mirror 5 and the central axis of the optical fiber 6). The optical fiber 6 previously has been installed in the fiber embedding groove 11 (not shown in FIGS. 4A to 4D). From above the quartz glass substrate 3 fixed on the base 20, a rotating blade (e.g., a dicing saw) 21 is brought down along a direction which is perpendicular to the bottom face of the base 20, so as to cut half-way into the quarts glass substrate 3. As a result, a groove 3a is formed in the quartz glass substrate 3 as shown in FIG. 4B. Thereafter, the quartz glass substrate 3 is washed with an organic solvent, and washed with purified water in order to remove any debris which is left after the cutting process. Then, the output-monitoring photodiode 4 is bonded onto the upper face of the quartz glass substrate 3. Thereafter, the half mirror 5 is inserted into the groove 3a in the quartz glass substrate 3 as shown in FIG. 4C. A resin (not shown), e.g. an ultraviolet (UV) curable resin, whose refractive index is matched with that of the material (i.e., quartz glass) composing the fiber embedding substrate 3 and/or the optical fiber 6, is applied so as to fill any interspaces or gaps (not shown) between the half mirror 5, the optical fiber 6, and the quartz glass substrate 3, and to fill any interspaces (not shown) between the optical fiber 6 and the output-monitoring photodiode 4. Then, as shown in FIG. 4D, UV rays (indicated by the arrows) are irradiated so as to cure the resin whose refractive index is matched with the quartz glass composing the fiber embedding substrate 3 and/or the optical fiber 6. As a result, the half mirror 5 is stabilized to the quartz glass substrate 3.

The aforementioned alignment markers 12 and the V-groove 7 are provided on the Si substrate 1 through a highly precise semiconductor process, such as photolithography and anisotropic etching. As a result, the semiconductor laser device 2 and the optical fiber 6 can be mounted on the Si substrate 1 by referencing to the alignment markers 12 and the V-groove 7, respectively, thereby attaining a positioning accuracy on the order of submicrons. Thus, the semiconductor laser device 2 can be coupled to the optical fiber 6 with a high positioning accuracy, thereby improving the coupling efficiency for any light which is propagated between the semiconductor laser device 2 and the optical fiber 6.

However, the coupling efficiency may greatly fluctuate if a mode hopping occurs as a result of multiple reflection between the semiconductor laser device 2 and the optical fiber 6. In order to avoid this, it is preferable to use a resin whose refractive index to matched with that of the material (quartz glass) of the optical fiber 6 to bury at least the interspace between the semiconductor laser device 2 and the optical fiber 6, and more preferably the vicinity where the semiconductor laser device 2 is coupled to the optical fiber 6. As a result, the multiple reflection between the semiconductor laser device 2 and the optical fiber 6 can be eliminated.

As used herein, a resin whose refractive index is "matched with" that of a given material is meant to have a refractive index which is substantially equal to the refractive index of that material.

It is preferable to bury the interspaces between the quartz glass substrate 3 and a light incident face (defined below) of the output-monitoring photodiode 4 with a resin whose refractive index is matched with that of the material composing the fiber embedding substrate 3 and/or the optical fiber 6 (both of which are composed of quartz glass in the present example) in order to prevent unwanted light reflection.

In general, an optical communications module is required to provide a sufficient return loss in order to prevent the light which enters the module from the optical fiber 6 (whose distal end may be coupled to a main communications system or the like) from being reflected back in the distal direction of the optical fiber 6. In order to attain a sufficient return loss, it is preferable to mount the semiconductor laser device 2 at an angle with respect to the central axis of the optical fiber 6.

Furthermore, in order to obtain a high coupling efficiency between the semiconductor laser device 2 and the optical fiber 6 coupled thereto, it is desirable to employ a semiconductor laser device having a large spot size, e.g., a narrow divergence angle laser device or a spot size conversion laser device. In applications whose primary purpose is a single wavelength lasing (e.g., a light source for a wavelength division multiplexing optical system), it is preferable to employ a DFB (distribution feed back) laser device, which provides a narrow divergence angle function. In applications which are required to provide high output power (e.g., a fiber amplifier), it is desirable to employ a high power laser device having a long cavity length for use as a pump light source.

In the case of employing a semiconductor laser device having an ordinary spot size, it is possible to obtain high coupling efficiency by employing an optical fiber having substantially the same core diameter as the spot size of the semiconductor laser device and directly coupling the light which is emitted from the semiconductor laser device to the optical fiber.

Figure 5A:
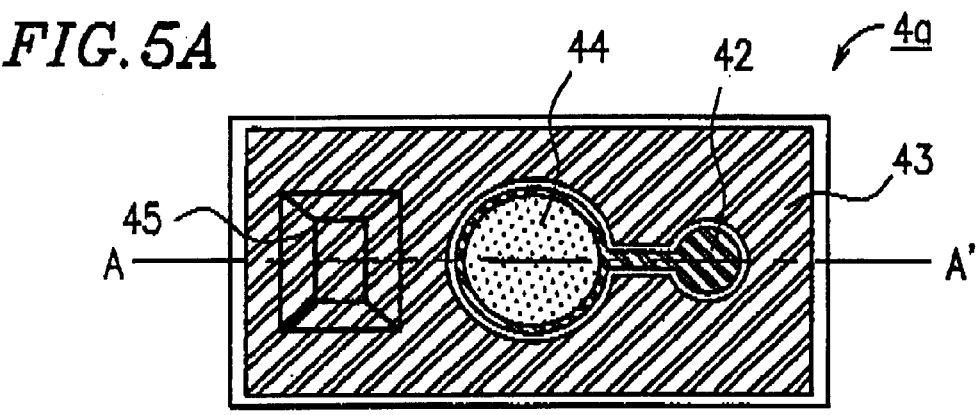
FIG. 5A is a plan view showing a face-down type output-monitoring photodiode 4a for use in an optical communications module according to the present invention.
Figure 5B:
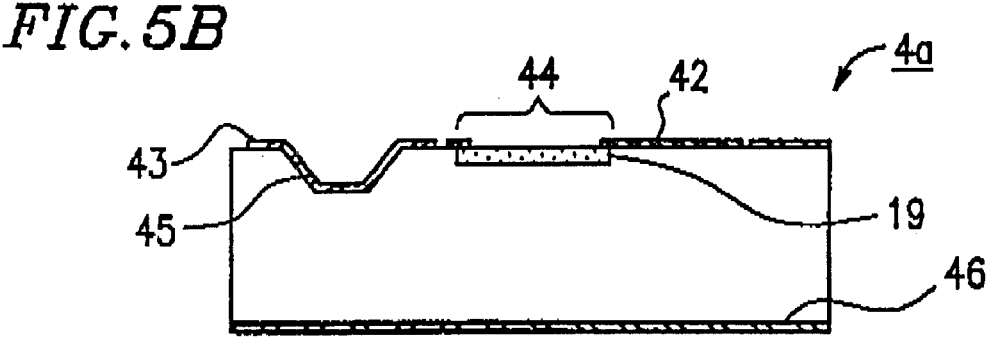
FIG. 5B is a cross-sectional view taken along line A—A' in FIG. 5A.
Figure 5C:
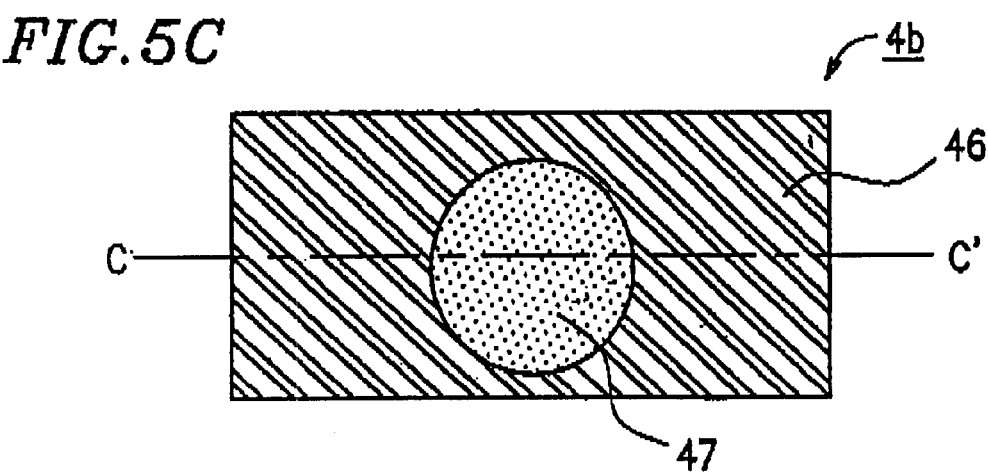
FIG. 5C is a plan view showing a face-up type output-monitoring photodiode 4b for use in an optical communications module according to the present invention.
Figure 5D:
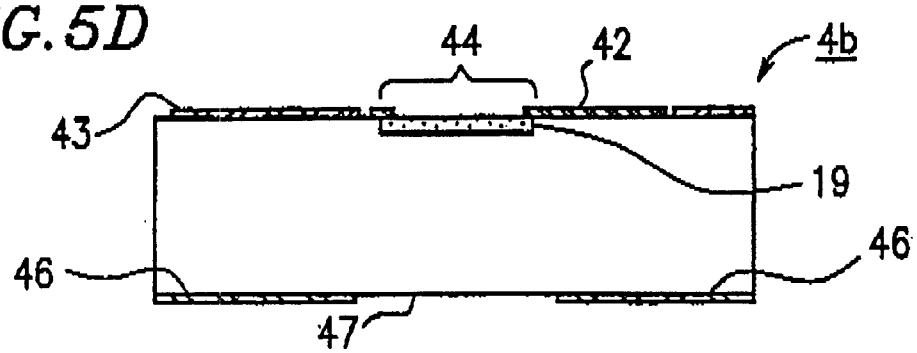
FIG. 5D is a cross-sectional view taken along line C—C' In FIG. 5C.

As the output-monitoring photodiode 4, a surface incidence type photodiode may be used, e.g., a photodiode for face-down mounting (shown in FIGS. 5A and 5B) or a photodiode for face-up mounting (shown in FIGS. 5C and 5D). FIG. 5A is a plan view showing a face-down type photodiode 4a; FIG. 5B is a cross-sectional view taken along line A—A' in FIG. 5A. FIG. 5C is a bottom view showing a face-up type photodiode 4b; FIG. 5D is a cross-sectional view taken along line C—C' in FIG. 5C.

As used herein, a face of a photodiode which has a light-receiving portion 19 formed therein is referred to as a "light-receiving face", whereas a face of a photodiode through which light is allowed to enter is referred to as a "light-incidence face". Note that a "light-receiving face" and a "light-incidence face" may be the same face or the opposite faces of a photodiode, as described in more detail below.

With reference to FIGS. 5A and 5B, the face-down type photodiode 4a may be mounted, face-down, on the quartz glass substrate 3 so that the face (i.e., light-receiving face) of the photodiode 4a having the light-receiving portion 19 formed therein adjoins the quartz glass substrate 3. The face-down type photodiode 4a includes the light-receiving portion 19, a p-type wiring pattern 42, and an n-type wiring pattern 43 provided on its light-receiving face. Note that the light-receiving face of the face-down type photodiode 4a is also a light-incidence face for allowing the incident light to pass through. A light-receiving region 44 defines a light-incident region. It is desirable to provide an antireflective film (not shown) in the light-receiving region 44. It is also desirable to provide an engraved n-type electrode 45 so that it is unnecessary to perform a wire bonding process after the photodiode 4a in mounted on the upper face of the quartz glass substrate 3. In order to block noise light, i.e., light other than the monitoring light, the n-type wiring pattern 43 is provided on the light-receiving face of the face-down type photodiode 4a in all regions except for the light-receiving region 44, thereby functioning as a light-shielding metal pattern. It is also desirable to provide a light-shielding film 46 on the opposite face of the photodiode 4a in order to block noise light, The light-shielding film 46 may be a metal light-shielding film which is formed of the same material as the n-type electrode.

Alternatively, with reference to FIGS. 5C and 5D, the face-up type photodiode 4b may be mounted, face-up, on the quartz glass substrate 3 so that the opposite face to its light-receiving face (i.e., the face having the light-receiving portion 19 formed therein) adjoins the quartz glass substrate 3. As in the case of the aforementioned face-down type photodiode 4a, the face-up type photodiode 4b includes the light-receiving portion 19, a p-type wiring pattern 42, and an n-type wiring pattern 43 provided on the light-receiving face. Note that the opposite face to the light-receiving face of the photodiode 4b defines a light-incidence face for allowing the incident light to pass through. In order to block noise light, i.e. light other than the monitoring light, the n-type wiring pattern 43 is provided on the light-receiving face of the face-up type photodiode 4b in all regions except for the light-receiving region 44, thereby functioning as a light-shielding metal pattern. It is also desirable to provide a light-shielding film 46 on the opposite face (i.e., the light-incidence face) of the photodiode 4b in order to block noise light. The light-shielding film 46 may be a metal light-shielding film which is formed of the same material as the n-type electrode. A light-incidence window 47 is provided in the light-shielding film 46 for allowing monitoring light to pass therethrough. It is desirable to provide an antireflective film (not shown) in the light-incidence window 47 for preventing reflection of the monitoring light (i.e., incident light). The light-incident window 47 defines a light-incident region.

Figure 6:
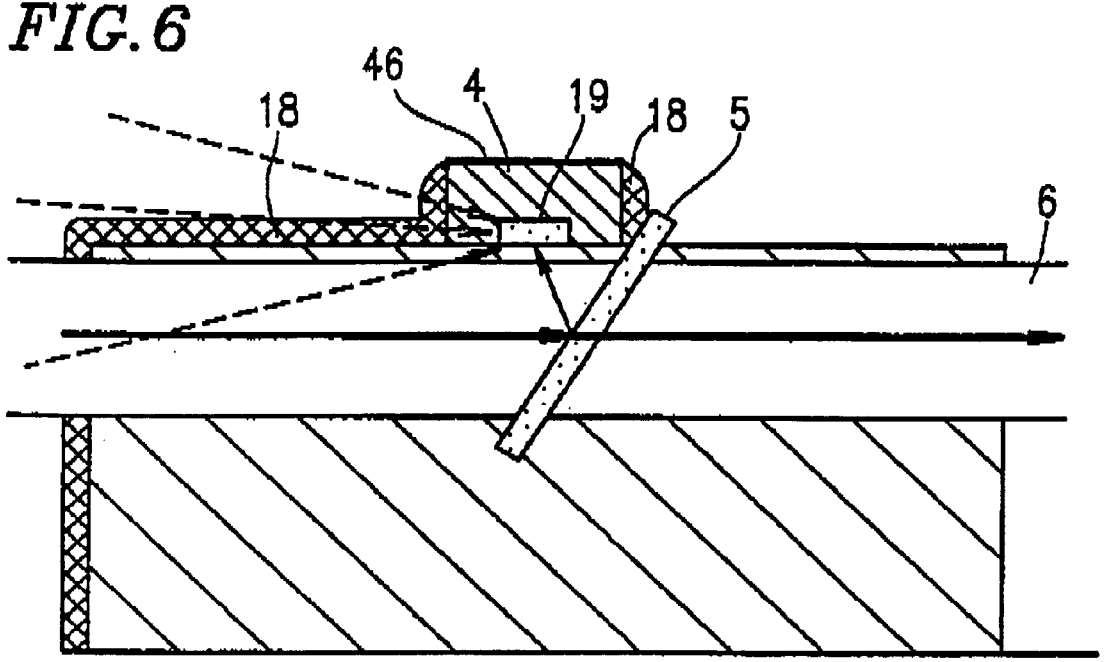
FIG. 6 is a cross-sectional view illustrating a method for blocking noise light in the optical communications module according to Example 1 of the present invention.

In order to further block noise light, as shown in FIG. 6, it is preferable to apply a coating film of light-shielding resin 18 on the facets other than the upper face and the bottom face of the output-monitoring photodiode 4 so as to prevent the noise light (as indicated by the thin, broken-line arrow) from reaching the light-receiving portion 19 while allowing the monitoring light (as indicated by the thin solid-line arrows) to reach the light-receiving portion 19.

EXAMPLE 2

Figure 7A:
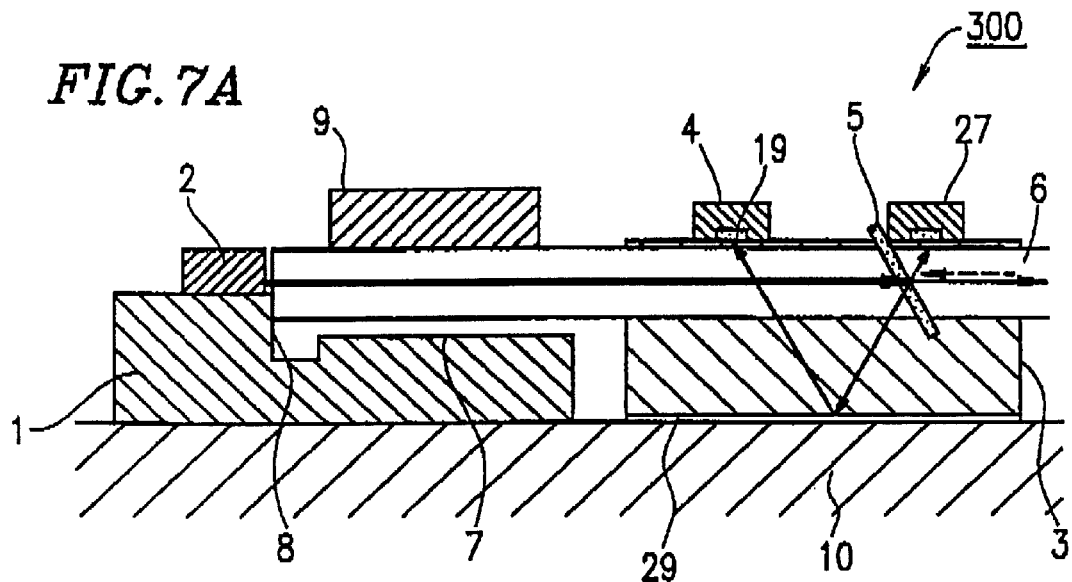
FIG. 7A is a across-sectional view of an optical communications module according to Example 2 of the present invention, taken along line X—X' in FIG. 7B.
Figure 7B:
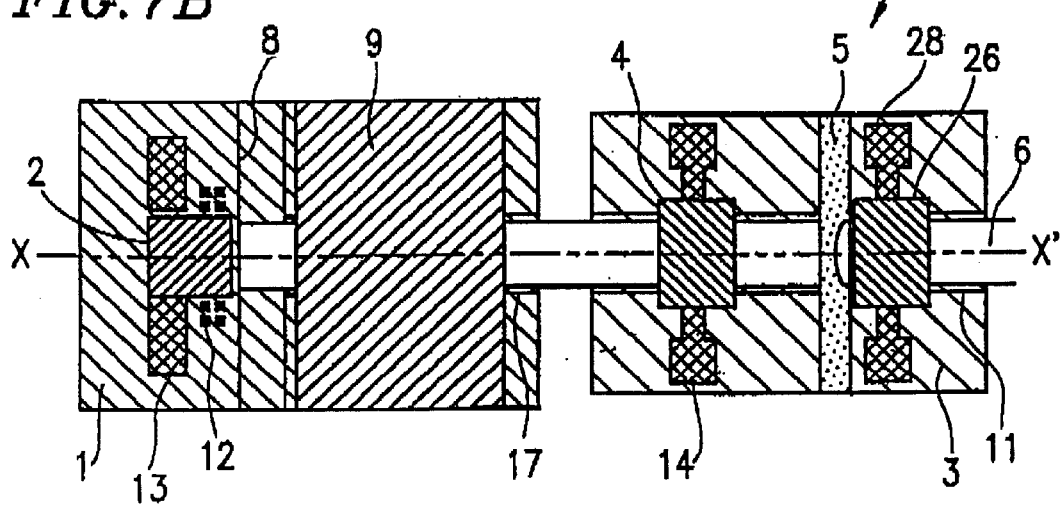
FIG. 7B is a plan view of the optical communications module shown in FIG. 7A.

An optical communications module 300 according to Example 2 of the present invention will be described with reference to FIGS. 7A, 7B, and 8. In FIGS. 7A, 7B, and 8, those component elements which have been described in Example 1 are denoted by the same reference numerals as used therein. FIG. 7A is a cross-sectional view of the optical communications module 300 taken along line X—X' in FIG. 7B. FIG. 7B is a plan view of the optical communications module 300. The thick arrows and the thin arrows in FIG. 7A represent the directions of propagation of signal light and monitor light, respectively.

The optical communications module 300 according to the present example is a light transmission/reception module. That is, the optical communications module 300 corresponds to, and serves the same functions as those of, the optical transmission/reception apparatus 200 according to Example 1 (FIG. 2). The optical communications module 300 has the same basic structure as that of the optical communications module 100 according to Example 1. The description of those component elements which have been described in Example 1 is omitted; those elements which specifically pertain to the present example will mainly be described below.

In accordance with the optical communications module 300, as shown in FIGS. 7A and 7B, a light splitting element 5, e.g., a half mirror, is inserted in a quartz glass substrate 3 at an angle of about 30° with respect to the central axis of an optical fiber 6. The half mirror 5 lies in the optical path within the optical fiber 6. A total reflection film 29, which may be formed of a metal material, is provided on the bottom face of the quartz glass substrate 3 for further reflecting the monitoring light which has been reflected from the half mirror 5. An output-monitoring photodiode 4 for monitoring the optical output is mounted on the upper face of the quartz glass substrate 3 astride a fiber embedding groove 11 for receiving the monitoring light which has been reflected from the total reflection film 29. In addition, a reception photodiode 27 is mounted on the upper face of the quartz glass substrate 3 astride the fiber embedding groove 11 for receiving an external light signal (received light signal; indicated by the broken arrows in FIG. 7A) which has been reflected from the half mirror 5. The reception photodiode 27 is connected to wiring patterns 28 formed on the upper face of the quartz glass substrate 3.

In accordance with the optical communications module 300 having the aforementioned structure, approximately half of the light which has been emitted from the semiconductor laser device 2 and thereafter coupled into and propagated through the optical fiber 6 is reflected by the half mirror (light splitting element) 5, so as to be downwardly deflected toward the bottom face of the quartz glass substrate 3. The reflected monitoring light is subjected to total reflection at the total reflection film 29 on the bottom face of the quartz glass substrate 3 so as to be upwardly deflected toward the upper face of the quartz glass substrate 3. The reflected monitoring light is received by the output-monitoring photodiode 4, which can be accurately positioned on the upper face of the quartz glass substrate 3.

The light which is received by the output-monitoring photodiode 4 generates a photocurrent which is utilized for controlling the optical output of the semiconductor laser device 2, as in Example 1. The half mirror scan be provided on the quartz glass substrate 3 in the same manner as in Example 1. As will be appreciated by those skilled in the art, the light splitting element 5 is not limited to a half mirror. Any means which is capable of splitting light can be suitably employed.

The half mirror 5 according to the present example has a reflectance of about 50%. If the output-monitoring photodiode 4 is mounted face-down on the quartz glass substrate 3, the reflected light from the half mirror 5 has a beam radius of about 85 µm on the light-receiving face (this point will be described later in more detail with reference to FIG. 11), so that a photocurrent of about 0.42 mA is expected to flow under the conditions that the output-monitoring photodiode 4 has a sensitivity of about 1 mA/mW and that the semiconductor laser device 2 provides an optical output power of about 2 mW this level of photocurrent is sufficient for performing optical output control.

If the output-monitoring photodiode 4 is mounted face-up on the quartz glass substrate 3, the reflected light from the half mirror 5 has a beam radius of about 100 µm on the light-receiving face (assuming that the output-monitoring photodiode 4 has a thickness of about 180 µm), so that a photocurrent of about 0.35 mA is expected to flow under the conditions that the output-monitoring photodiode 4 has a sensitivity of about 1 mA/mW and that the semiconductor laser device 2 provides an optical output power of about 1 mW. This level of photocurrent is sufficient for performing optical output control.

According to the present example, as in Example 1, a portion of the optical output from the front facet of the semiconductor laser device 2 is utilized as monitoring light for monitoring the optical output of the semiconductor laser device 2. This eliminates the need for obtaining any optical output from the rear facet of the semiconductor laser device 2, as shown in FIG. 7A. Therefore, a low reflectance film 16 and a high reflectance film 17, respectively, are coated on the front facet and the rear facet of the semiconductor laser device 2. The use of such coatings on the front and rear end faces of the semiconductor laser device 2 introduces an improvement of about 10% in the optical output power. The high reflectance film 17 on the rear facet of the semiconductor laser device 2 preferably has a reflectance of about 100% so that substantially 100% optical output power is obtained from the front facet of the semiconductor laser device 2.

Alignment markers 12 and a V-groove 7 (similar to those described in Exanmple 1) are provided on the Si substrate 1 through a highly precise semiconductor process, such as photolithography and anisotropic etching. As a result, the semiconductor laser device 2 and the optical fiber 6 can be mounted on the Si substrate 1 by referencing to the alignment markers 12 and the V-groove 7, respectively, thereby attaining a positioning accuracy on the order of submicrons. Thus, the semiconductor laser device 2 can be coupled to the optical fiber 6 with a high positioning accuracy, thereby improving the coupling efficiency for any light which is propagated between the semiconductor laser device 2 and the optical fiber 6.

However, the coupling efficiency may greatly fluctuate if a mode hopping occurs as a result of multiple reflection between the semiconductor laser device 2 and the optical fiber 6. In order to avoid this, it is preferable to use a resin whose refractive index is matched with that of the material (quartz glass) of the optical fiber 6 to bury at least the interspace between the semiconductor laser device 2 and the optical fiber 6, and more preferably the vicinity where the semiconductor laser device 2 is coupled to the optical fiber 6. As a result, the multiple reflection between the semiconductor laser device 2 and the optical fiber 6 can be eliminated.

It is preferable to bury the interspaces between the quartz glass substrate 3 and a light incident face of the output-monitoring photodiode 4 with a resin whose refractive index is matched with that of the material composing the fiber embedding substrate 3 and/or the optical fiber 6 (both of which are composed of quartz glass in the present example).

In order to ensure that the optical communications module 300 attains a sufficient return lose, it is preferable to mount the semiconductor laser device 2 at an angle with respect to the central axis of the optical fiber 6.

Furthermore, in order to obtain a high coupling efficiency between the semiconductor laser device 2 and the optical fiber 6 coupled thereto it is desirable to employ a semiconductor laser device having a large spot size, e.g., a narrow divergence angle laser device or a spot size conversion laser device. In applications whose primary purpose is a single wavelength lasing (e.g, a light source for a wavelength division multiplexing optical system), it is preferable to employ a DFB laser device, which provides a narrow divergence angle function. In applications which are required to provide high output power (e.g., a fiber amplifier), it is desirable to employ a high power laser device having a long cavity length for use as a pump light source.

In the case of employing a semiconductor laser device having an ordinary spot size, it is possible to obtain high coupling efficiency by employing an optical fiber having substantially the same core diameter as the spot size of the semiconductor laser device and directly coupling the light which is emitted from the semiconductor laser device to the optical fiber.

As the output-monitoring photodiode 4, a surface incidence type photodiode may be used, e.g., a photodiode for face-down mounting (shown in FIGS. 5A and 5B) or a photodiode for face-up mounting (shown in FIGS. 5C and 5D). AS in Example 1, in the case where the output-monitoring photodiode 4 is mounted face-down on the quartz glass substrate 3, it is desirable to provide an antireflective film (not shown) in the light-receiving region 44. It is also desirable to provide an engraved n-type electrode 45 so that it is unnecessary to perform a wire bonding process after the photodiode 4 is mounted on the upper face of the quartz glass substrate 3. In order to block noise light, i.e., light other than the monitoring light, it is desirable to provide an n-type wiring pattern 43 (also functioning as a light-shielding metal pattern) on the light-receiving face of the face-down type photodiode 4a, and provide a light-shielding film 46 on the opposite face of the photodiode 4a.

Alternatively, in the case where the output-monitoring photodiode 4 is mounted face-up on the quartz glass substrate 3, as shown in FIGS. 5C and 5D, it is desirable to provide an n-type wiring pattern 43 (also functioning as a light-shielding metal pattern) on the light-receiving face of the face-up type photodiode 4b, and provide a light-incidence window 47 and a light-shielding film 46 on the light-incidence face, i.e., the opposite face to the light-receiving face, of the photodiode 4b. It is desirable to provide an antireflective film (not shown) in the light-incidence window 47.

In order to further block noise light, as shown in FIG. 8, it is preferable to apply a coating film of light-shielding resin 18 on the facets other than the upper face and the bottom face of the output-monitoring photodiode 4 so as to prevent the noise light (as indicated by the thin, broken-line arrow) from reaching the light-receiving portion 19 while allowing the monitoring light (as indicated by the thick arrows) to reach the light-receiving portion 19.

EXAMPLE 3

Figure 9A:
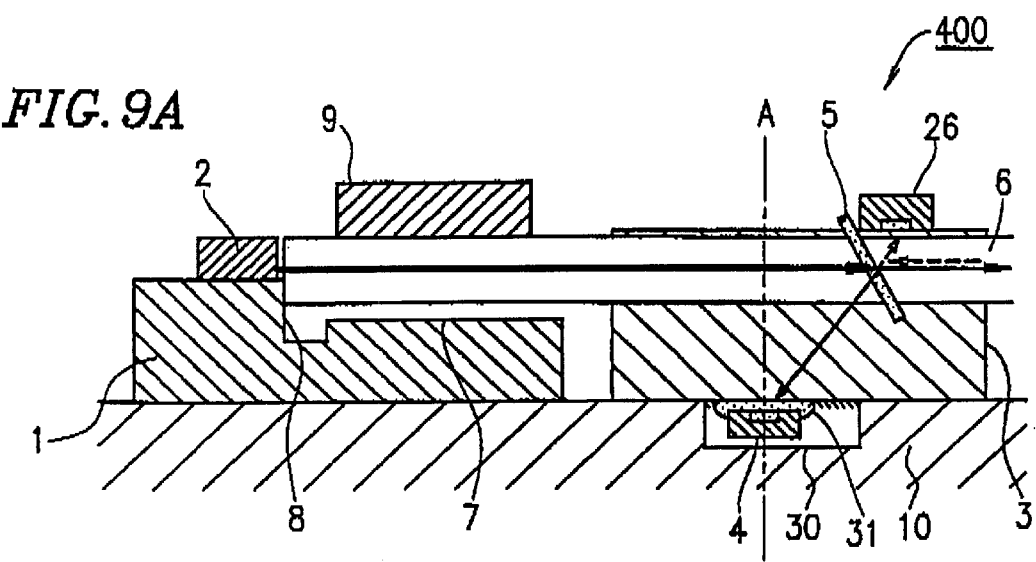
FIG. 9A is a cross-sectional view of an optical communications module according to Example 3 of the present invention, taken along line X—X' in FIG. 9B.
Figure 9B:
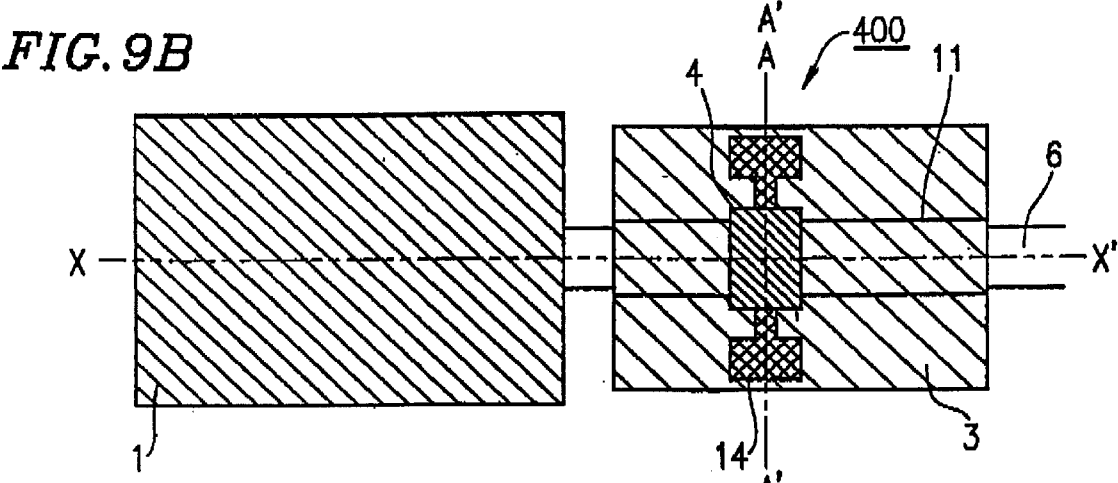
FIG. 9B is a bottom view of the optical communications module shown in FIG. PA.
Figure 9C:
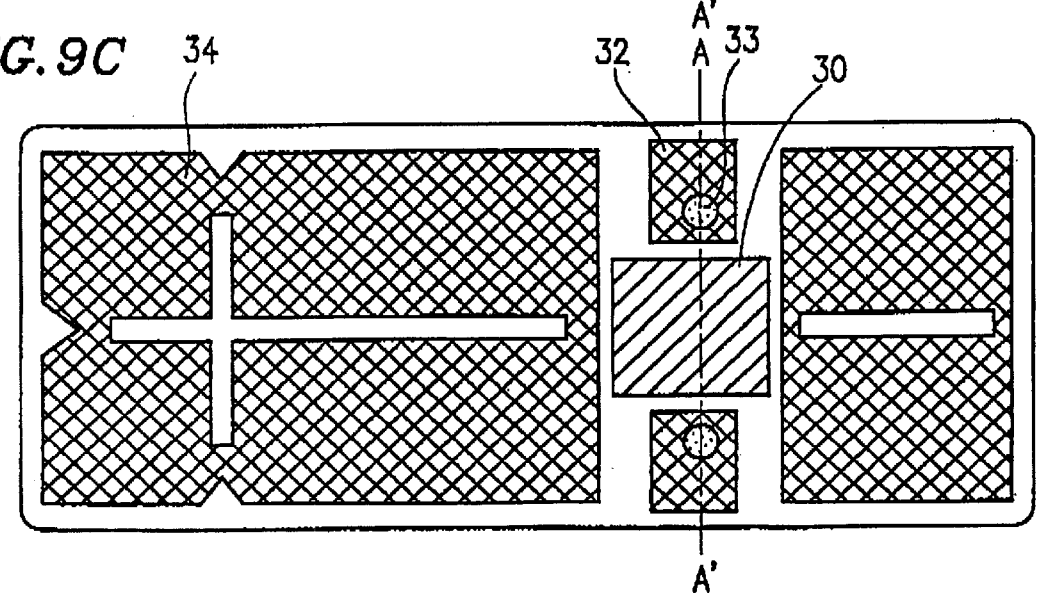
FIG. 9C is a plan view showing the inside of a bottom face of a package in which the optical communications module is mounted.

An optical communications module 400 according to Example 3 of the present invention will be described with reference to FIGS. 9A, 9B, 9C, and 10A and 10B. In FIGS. 9A, 9B, 9C, and 10A and 10B, those component elements which have been described in Example 1 or 2 are denoted by the same reference numerals as used therein. FIG. 9A is a cross-sectional view of the optical communications module 400 taken along line X—X' in FIG. 9B. FIG. 9B is a bottom view of the optical communications module 400. FIG. 9C is a plan view showing the inside of a bottom face 10 of a package in which the optical communications module 400 is mounted. The thick solid-line arrows and the thin solid-line arrows in FIG. 9A represent the directions of propagation of signal light and monitor light, respectively. FIGS. 10A and 10B illustrate applications of the present invention, incorporating respectively different types of output-monitoring photodiodes 4. FIG. 10A is a cross-sectional view, taken along line A—A'in FIGS. 9A to 9C, showing an optical communications module 400 incorporating a face-down type output-monitoring photodiode 4. FIG. 10B is a cross-sectional view, taken along line A—A' in FIGS. 9A to 9C, showing an optical communications module 400 incorporating a face-up type output-monitoring photodiode 4.

The optical communications module 400 according to the present example is a light transmission/reception module. That is, the optical communications module 400 serves the same functions as those of the optical transmission/reception apparatus 200 according to Example 1 (FIG. 2) and the optical communications module 300 according to Example 2 (FIGS. 7A and 7B). The optical communications module 400 has the same basic structure as that of the optical communications module 300 according to Example 2. The description of those component elements which have been described in Example 2 is omitted; those elements which specifically pertain to the present example will mainly be described below.

As shown in FIGS. 9A and 9B, the optical communications module 400 according to the present example does not includes a total reflection film 29 on the bottom face of the quartz glass substrate 3. Rather, a concavity 30 is provided on the inside of the bottom face 10 of the package in a portion of a region underlying a quartz glass substrate 3. A light splitting element 5, e.g., a half mirror, is inserted in a quartz glass substrate 3 at an angle of about 30° with respect to the central axis of an optical fiber 6. The half mirror 5 lies in the optical path within the optical fiber 6. Within the concavity 30, an output-monitoring photodiode 4 for receiving the monitoring light which has been reflected from the half mirror 5 is provided by being bonded to the quartz glass substrate 3. A resin 31 whose refractive index is matched with that of the material (i.e., quartz glass according to the present example) composing the fiber embedding substrate 3 and/or the optical fiber 6 is applied so as to fill any interspaces (not shown) between the bottom face of the quartz glass substrate 3 and the light-receiving face of the output-monitoring photodiode 4. The output-monitoring photodiode 4 is connected to wiring patterns 14 (FIG. 9B) formed on the bottom face of the quartz glass substrate 3.

The light which is received by the output-monitoring photodiode 4 generates a photocurrent which is utilized for controlling the optical output of the semiconductor laser device 2, as in Example 1. The half mirror 5 can be provided on the quartz glass substrate 3 in the same manner as in Example 1. As will be appreciated by those skilled in the art, the light splitting element 5 is not limited to a half mirror. Any means which is capable of splitting light can be suitably employed.

In the case where the output-monitoring photodiode 4 is mounted face-down on the quartz glass substrate 3, as best shown in FIG. 10A, the wiring patterns 14 on the bottom face of the quartz glass substrate 3 are electrically connected to wiring patterns 32 provided on the package via solder bumps 33. The wiring patterns 32 on the package are electrically connected to wiring patterns 36, which in turn are further connected to external electrodes (not shown), through via holes 35. No wire bonding is employed. Thus, the output-monitoring photodiode 4 can be electrically connected to the external electrodes (not shown) without requiring wire bonding.

Alternatively, in the case where the output-monitoring photodiode 4 is mounted face-up on the quartz glass substrate 3, as best shown in FIG. 10B, it is unnecessary to provide any wiring patterns 14 on the bottom face of the quartz glass substrate 3. Instead, the right and left wiring patterns 32 on the package extend to the bottom face of the concavity 30 so as not to electrically contact each other. Thus, the output-monitoring photodiode 4 is mounted on the extension of one of the package wiring patterns 32 (i.e., the right pattern 32 in FIG. 10B), which serves as an n-type bottom electrode. In this case, the output-monitoring photodiode 4 can be connected to an external electrode by simply connecting a p-type electrode 39 (which may be formed on the light-receiving face of the output-monitoring photodiode 4) to the other wiring pattern 32 (i.e., the left wiring pattern 32 in FIG. 10B) via a wire lead 38. Furthermore, a resin whose refractive index is matched with that of the material composing the fiber-embedding substrate 3 and/or the optical fiber 6 is applied so as to fill any interspaces (not shown) between the light-receiving face of the output-monitoring photodiode 4 and the quartz glass substrate 3. The wiring patterns 32 on the package are adhered to the bottom face of the quartz glass substrate 3 by using an adhesive resin 37.

As in Example 2, the half mirror 5 according to the present example has a reflectance of about 50%. If the output-monitoring photodiode 4 is mounted face-down on the quartz glass substrate 3 the reflected light from the half mirror 5 has a beam radius of about 42 $\mu$m on the light-receiving face (this point will be described later in more detail with reference to FIG. 11), so that a photocurrent of about 0.89 mA is expected to flow under the conditions that the output-monitoring photodiode 4 has a sensitivity of about 1 mA/mW and that the semiconductor laser device 2 provides an optical output power of about 1 mW. This level of photocurrent is sufficient for performing optical output control.

If the output-monitoring photodiode 4 is mounted face-up on the quartz glass substrate 3, the reflected light from the half mirror 5 has a beam radius of about 60 $\mu$m on the light-receiving face (assuming that the output-monitoring photodiode 4 has a thickness of about 180 $\mu$m), so that a photocurrent of about 0.68 mA is expected to flow under the conditions that the output-monitoring photodiode 4 has a sensitivity of about 1 mA/mW and that the semiconductor laser device 2 provides an optical output power of about 1 mW. This level of photocurrent is sufficient for performing optical output control.

According to the present example, as in Example 1, a portion of the optical output from the front facet of the semiconductor laser device 2 is utilized as monitoring light for monitoring the optical output of the semiconductor laser device 2. This eliminates the need for obtaining any optical output from the rear facet of the semiconductor laser device 2, as shown in FIG. 9. Therefore, a low reflectance film 16 and a high reflectance film 17, respectively, are coated on the front facet and the rear facet of the semiconductor laser device 2. The use of such coatings on the front and rear end faces of the semiconductor laser device 2 introduces an improvement of about 10% in the optical output power. The high reflectance film 17 on the rear facet of the semiconductor laser device 2 preferably has a reflectance of about 100% so that substantially 100% optical output power is obtained from the front facet of the semiconductor laser device 2.

Alignment markers 12 and a V-groove 7 (similar to those described in Example 1 ) are provided on the Si substrate 1 through a highly precise semiconductor process, such as photolithography and anisotropic etching. As a result, the semiconductor laser device 2 and the optical fiber 6 can be mounted on the Si substrate 1 by referencing to the alignment markers 12 and the V-groove 7, respectively, thereby attaining a positioning accuracy on the order of submicrons. Thus, the semiconductor laser device 2 can be coupled to the optical fiber 6 with a high positioning accuracy, thereby improving the coupling efficiency for any light which is propagated between the semiconductor laser device 2 and the optical fiber 6.

However, the coupling efficiency may greatly fluctuate if a mode hopping occurs as a result of multiple reflection between the semiconductor laser device 2 and the optical fiber 6. In order to avoid this, it is preferable to use a resin whose refractive index is matched with that of the material (quartz glass) of the optical fiber 6 to bury at least the interspace between the semiconductor laser device 2 and the optical fiber 6, and more preferably the vicinity where the semiconductor laser device 2 is coupled to the optical fiber 6. As a result, the multiple reflection between the semiconductor laser device 2 and the optical fiber 6 can be eliminated.

It is preferable to bury the interspaces between the quartz glass substrate 3 and a light incident face of the output-monitoring photodiode 4 with a resin whose refractive index is matched with that of the material composing the fiber embedding substrate 3 and/or the optical fiber 6 (both of which are composed of quartz glass in the present example).

In order to ensure that the optical communications module 400 attains a sufficient return loss, it is preferable to mount the semiconductor laser device 2 at an angle with respect to the central axis of the optical fiber 6.

Furthermore, in order to obtain a high coupling efficiency between the semiconductor laser device 2 and the optical fiber 6 coupled thereto, it is desirable to employ a semiconductor laser device having a large spot size, e.g. a narrow divergence angle laser device or a spot size conversion laser device. In applications whose primary purpose is a single wavelength lasing (e.g., a light source for a wavelength division multiplexing optical system), it is preferable to employ a DFB laser device, which provides a narrow divergence angle function. In applications which are required to provide high output power (e.g., a fiber amplifier), it is desirable to employ a high power laser device having a long cavity length for use as a pump light source.

In the case of employing a semiconductor laser device having an ordinary spot size, it is possible to obtain high coupling efficiency by employing an optical fiber having substantially the same core diameter as the spot size of the semiconductor laser device and directly coupling the light which is emitted from the semiconductor laser device to the optical fiber.

As the output-monitoring photodiode 4, a surface incidence type photodiode may be used, e.g., a photodiode for face-down mounting (shown in FIG. 10A) or a photodiode for face-up mounting (shown in FIG. 10B). As in Example 1, in the case where the output-monitoring photodiode 4 is mounted face-down on the quartz glass substrate 3 (as shown in FIG. 10A), it is desirable to provide an antireflective film (not shown) in the light-receiving region 44 (see FIGS. 5A and 5B). It is also desirable to provide an engraved n-type electrode 45 so that it is unnecessary to perform a wire bonding process after the photodiode 4 is mounted on the upper face of the quartz glass substrate 3.

Alternatively, in the case where the output-monitoring photodiode 4 is mounted face-up on the quartz glass substrate 3 (as shown in FIG. 10B), it is desirable to provide an antireflective film (not shown) in the light-incidence window 47 (see FIGS. 5C and 5D).

According to the present invention, as described in Examples 1 to 3 above, a portion of the light which has been emitted from the front facet of the semiconductor laser device 2 and coupled to the optical fiber 6 is utilized as monitoring light from which to generate a signal for optical output control. The optical output monitoring mechanism according to the present invention can be implemented in a simple configuration using an optical fiber-embedding type optical circuit, as described in Examples 1 to 3 above. The optical fiber-embedding type optical circuit is capable of deflecting the optical path by the action of a light splitting element 5 (e.g. a filter or a half mirror) which is inserted in the optical.path at an angle with respect to the central axis of an optical fiber 6 which is embedded within a transparent substrate 3 (e.g., a quartz glass substrate).

In accordance with the aforementioned configuration, it is possible to prevent deterioration in the tracking error characteristics due to discrepancies between the temperature characteristics of the coupling efficiency between the semiconductor laser device 2 and the optical fiber 6 and the temperature characteristics of the light-current conversion efficiency of the output-monitoring photodiode 4.

In accordance with the aforementioned configuration, it is also possible to prevent deterioration in the tracking error characteristics despite any discrepancies between the respective radiation angle-temperature characteristics on the front facet and the rear facet of the semiconductor laser device 2.

Figure 11:
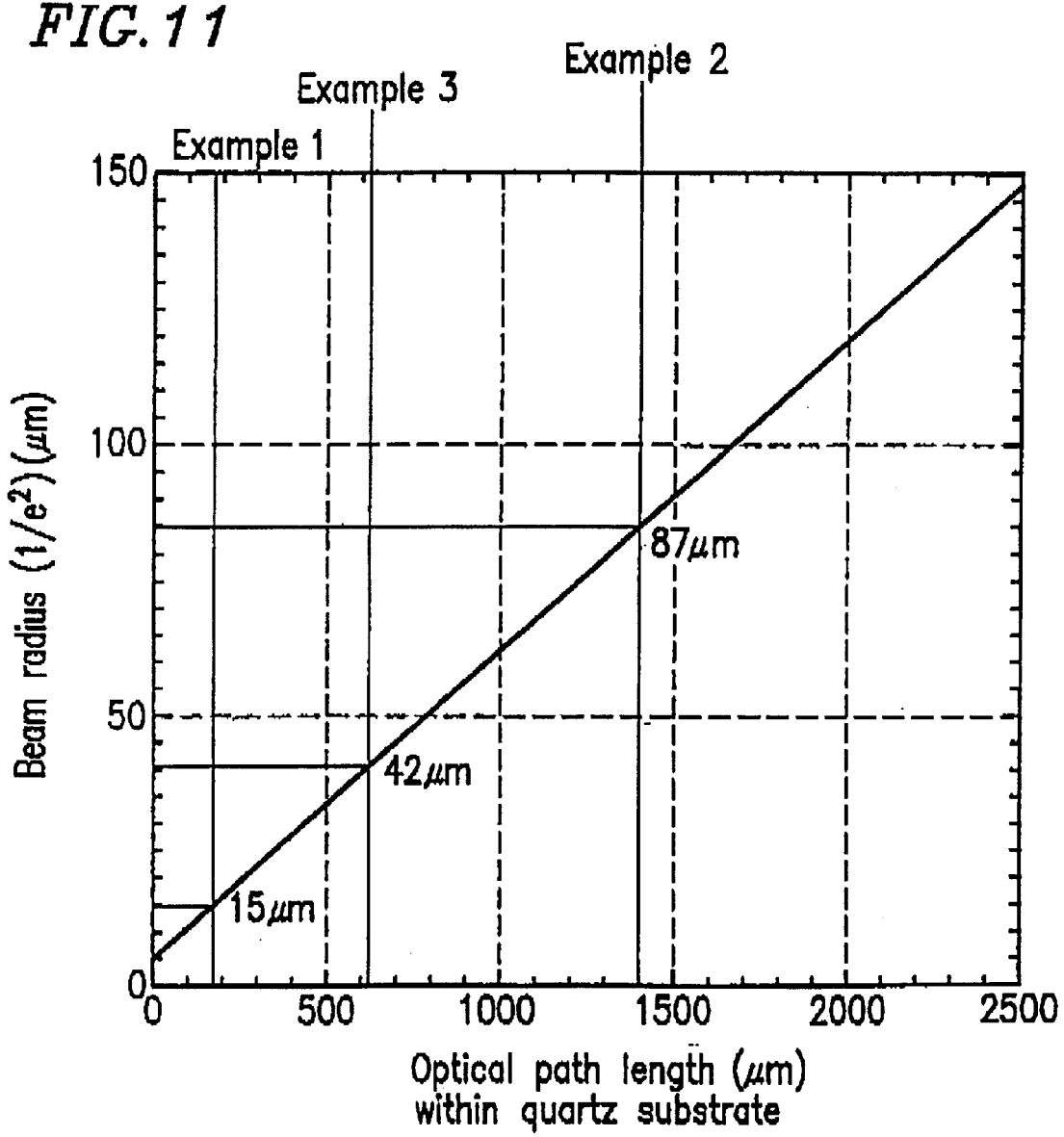
FIG. 11 is a graph illustrating the relationship between the optical path length within a quartz glass substrate and the beam radius in the optical communications modules according to Examples 1 to 3 of the present invention.

FIG. 11 is a graph illustrating various beam radii created on the light-incidence face of output-monitoring photodiode 4 for allowing monitoring light to pass therethrough, with respect to the respective methods of mounting the plane-incidence type output-monitoring photodiodes 4 according to Examples 1 to 3. As seen from FIG. 11, the beam radius according to Examples 1, 3, and 2 become increasingly larger in this order; this is due to the respectively longer optical paths within the quartz glass substrates 3 according to Examples 1, 3, and 2.

Specifically, according to Example 1, the output-monitoring photodiode 4 provided on the upper face of the substrate directly receives the monitoring light which has been reflected from the half mirror 5. On the other hand, according to Example 3, the output-monitoring photodiode 4 provided on the bottom face of the substrate directly receives the monitoring light which has been reflected from the half mirror 5. As a result, the optical path length is longer in Example 3 than in Example 1. According to Example 2, the output-monitoring photodiode 4 receives the monitoring light which has been reflected from the half mirror 5 and further reflected by the total reflection film 29 on the bottom face of the substrate. As a result, the optical path length is still longer in Example 2 than in Example 3.

The light-receiving radius, sensitivity, and mounting margin of the output-monitoring photodiode 4 and the reflectance of the half mirror 5 may be optimized depending on each specific beam radius as shown in the graph of FIG. 11. For example, according to Example 1, where the beam radius is relatively small, a sufficient amount of monitoring light can be obtained for output monitoring purposes even when the reflectance the half mirror 5 is reduced by about 5% to about 15% relative to Examples 2 and 3. Furthermore, it will be appreciated that the structure according to Example 1 allows for a larger mounting margin than in Examples 2 and 3 as described below.

Figure 12:
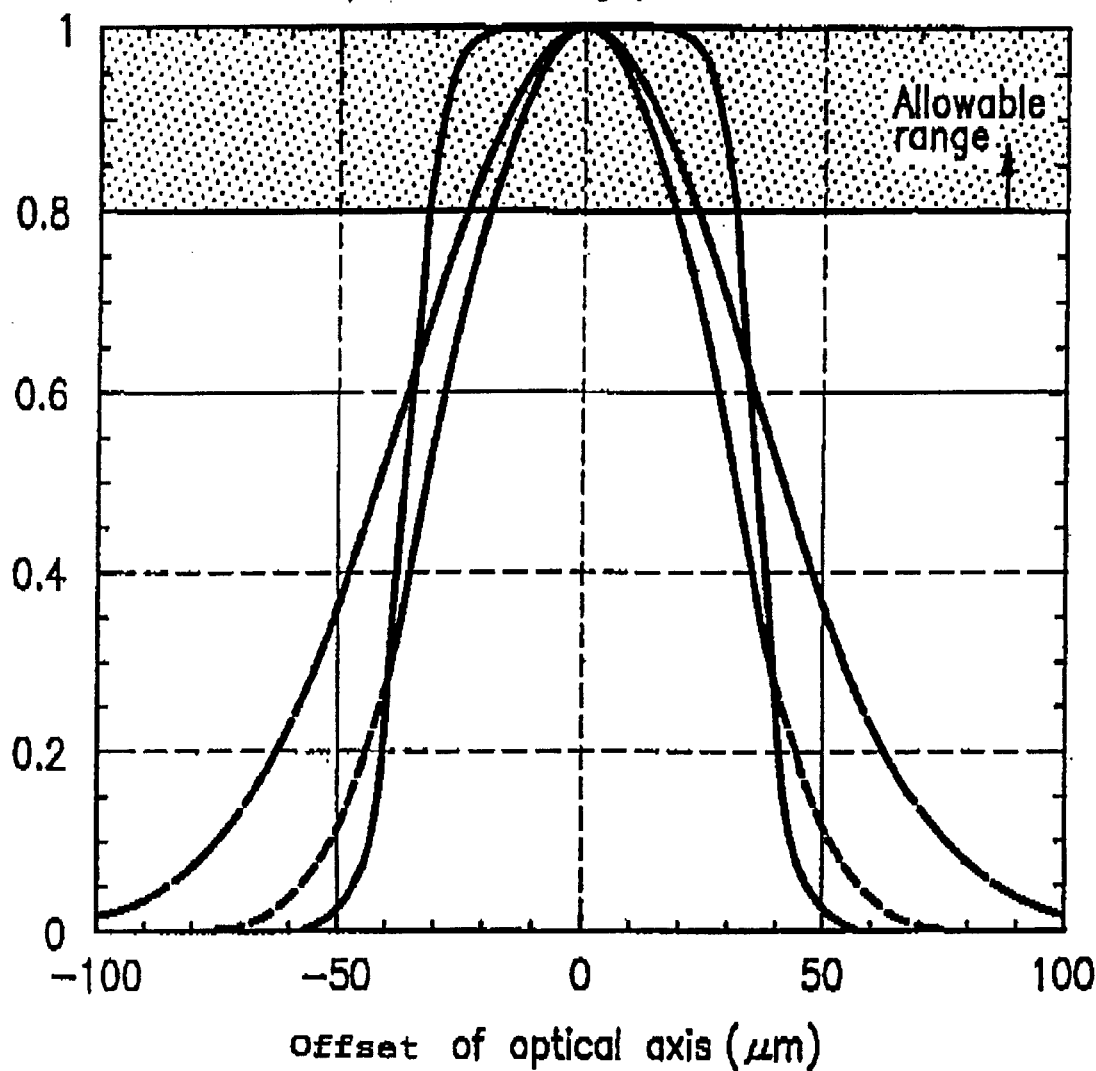
FIG. 12 is a graph illustrating the mounting margin for the output-monitoring photodiode in accordance with the configurations of Examples 1 to 3 of the present invention.
Figure 13:
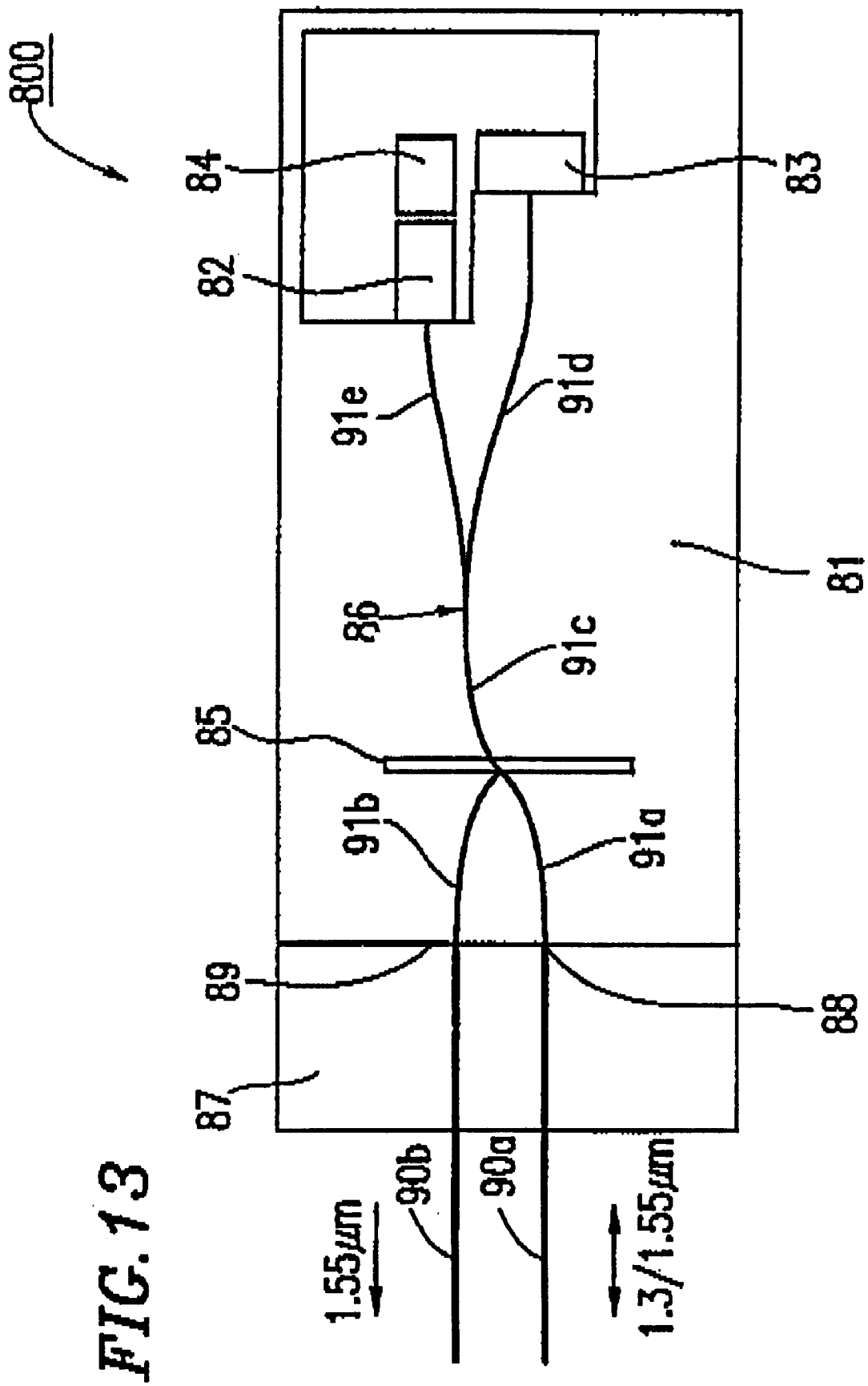
FIG. 13 is a plan view showing a conventional optical transmission/reception apparatus.

FIG. 12 is a graph illustrating the mounting margin for the output-monitoring photodiode 4 in accordance with the configurations of Examples 1 to 3, where each output-monitoring photodiode 4 has a light-receiving radius is about 80 µm. From FIG. 12, it can be seen that offsets of about ±31 µm (Example 1), about ±19 µm (Example 2), and about ±23 µm (Example 3) in the optical axis of the respective configuration are well within the allowable sensitivity (power) lose range of 1 dB (i.e., 80%). These mounting margin values are about five to six times larger than what is tolerated for a conventional waveguide-type photodiode. Thus, the structure according to the present invention can relax the mounting margin.

The resultant photocurrent for optical output controlling purposes is about 0.2 mA for Example 1 (under about 10% half mirror reflectance and about 2 mW semiconductor laser device optical output power), about 0.43 mA for Example 2 (under about 50% half mirror reflectance and about 1 mW semiconductor laser device optical output power), and about 0.89 mA for Example 3 (under about 50% half mirror reflectance and about 1 mW semiconductor laser device optical output power). These levels of photocurrent are sufficient for performing optical output control.

Furthermore, the bi-directional optical communications module according to the present invention incorporating an optical fiber-embedding type optical circuit can suitably employ a waveguide (optical fiber) maintained in a linear configuration, i.e., without deflecting the optical fiber. Since the deflection of the optical path can be achieved, without deflecting the optical fiber itself, by using a reflective-type filter, a half mirror, and the like, the size of the entire module is substantially determined as a function of the respective areas which are occupied by the filter or half mirror inserted in the optical path and the photodiode. In other words, the optical communications module according to the present invention only needs to be large enough to accommodate the filter or half mirror and the photodiode.

For example, an optical transmission/reception apparatus based on the optical fiber-embedding type optical communications module according to Example 2 or 3, the entire apparatus only needs to be about 10 to about 12 mm long along the optical axis direction, which means an about 50% reduction in size relative to a conventional PLC type optical transmission/reception apparatus.

Furthermore, the optical fiber-embedding type optical communications module according to the present invention utilizes a portion of an external transfer path or optical fiber as a waveguide within the module, thereby eliminating the need to connect the external transfer path or optical fiber to a port, as would be required in the case of a conventional PLC type transmission/reception apparatus. Accordingly, the optical communications module according to the present invention requires much less time for mounting.

As described above, the optical fiber-embedding type optical communications module according to the present invention makes possible an increased mounting margin and improved tracking error characteristics. Furthermore, the optical fiber-embedding type optical communications module according to the present invention can be implemented in a relatively small size, and all elements are surface mounted, thereby providing improved manufacturing efficiency.

The specific structures and materials for the respective component elements of the invention, e.g., semiconductor lasers, photodiodes, light splitting elements, and the optical fiber-embedding substrate are not limited to those described above.

Thus, the present invention can provide a low-cost, compact, and high-performance optical communications module having improved tracking error characteristics.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical communications module for use in an optical transfer system for bidirectionally transferring a light signal through an optical fiber, the optical communications module having a light signal transmission capability, wherein the optical communications module comprises:

a semiconductor laser;

an optical fiber coupled to a front facet of the semiconductor laser;

a light splitting element for light which is emitted from the front facet of the semiconductor laser and propagated within the optical fiber, an output-monitoring photodiode for reserving a portion of the light which has been split by the light splitting element as monitoring light, and generating a photocurrent based on the monitoring light, the photocurrent being used for controlling optical output of the semiconductor laser;

an optical fiber-embedding type optical circuit, the optical fiber-embedding type optical circuit comprising the optical fiber being embedded in an optical fiber-embedding substrate;

a reception photodide mounted on an upper face of the optical fiber-embedding substrate;

a metal total reflection film provided on an bottom face of the optical fiber-embedding substrate;

wherein the light splitting element comprises a half mirror which is inserted in the optical fiber-embedding substrate at an angle with respect to a central axis of the optical fiber, the half mirror laying in an optical path within the optical fiber, wherein the output-monitoring photodiode is mounted on the upper face of the optical fiber-embedding substrate, and wherein an external light signal propagated through the optical fiber is reflected from the half mirror so as to be received by the reception photodiode, and the monitoring light is reflected by the half mirror and the metal total reflection film so as to be received by the output-monitoring photodiode, whereby the optical communications module has an optical signal transmission/reception capability.

2. An optical communications module according to claim 1, further comprising a high reflectance film on a rear facet of the semiconductor laser and wherein the semiconductor laser is a laser device selected from a group consisting of a narrow divergence angle laser devices and spot size conversion laser devices.

3. An optical communications module according to claim 1, further comprising a high reflectance film on a rear facet of the semiconductor laser and wherein the semiconductor laser comprises a DFB laser devices.

4. An optical communications module according to claim 1, further comprising a high reflectance film on a rear facet of the semiconductor laser and wherein the semiconductor laser is a high power laser device for use as a pump light source.

5. An optical communications module for use in an optical transfer system for bidirectionally transferring a light signal through an optical fiber, the optical communications module having a light signal transmission capability, wherein the optical communications module comprises:
   a semiconductor laser;
   an optical fiber coupled to a front facet of the semiconductor laser;
   a light splitting element for splitting light which is emitted from the front facet of the semiconductor laser and propagated within the optical fiber;
   an output-monitoring photodiode for receiving a portion of the light which has been split by the light splitting element as monitoring light, and generating a photocurrent based on the monitoring light, the photocurrent being used for controlling optical output of the semiconductor lase;
   an optical fiber-embedding type optical circuit, the optical fiber-embedding type optical circuit comprising the optical fiber being embedded in an optical fiber-embedding substrate; and
   a reception photodiode mounted on an upper face of the optical fiber-embedding substrate,
   wherein the light splitting element comprises a half mirror which is inserted in the optical fiber-embedding substrate at an angle with respect to a central axis of the optical fiber, the half mirror lying in an optical path within the optical fiber,
   wherein the output-monitoring photodiode is mounted on a bottom face of the optical fiber-embedding substrate, and wherein an external light signal propagated through the optical fiber is reflected from the half mirror so as to be received by the reception photodiode, and
   the monitoring light is reflected by the half mirror so as to be received by the output-monitoring photodiode, whereby the optical communications module has an optical signal transmission/reception capability.

6. An optical communications module according to claim 5,
   wherein the optical communications module is mounted in a package, and
   wherein the output-monitoring photodiode mounted on the bottom face of the optical fiber-embedding substrate is located within a concavity formed in a bottom face of the package.

7. An optical communications module according to claim 5, further comprising a high reflectance film on a rear facet of the semiconductor laser and wherein the semiconductor laser is a laser device selected from a group consisting of narrow divergence angle laser devices and spot size conversion laser devices.

8. An optical communications nodule according to claim 5, further comprising a high reflectance film on a rear facet of the semiconductor laser and wherein the semiconductor laser comprises a DFB laser device.

9. An optical communications module according to claim 5, further comprising a high reflectance film on a rear facet of the semiconductor laser and wherein the semiconductor laser is a high power laser device for use as a pump light source.

10. An optical communications module for use in an optical transfer system for bidirectionally transferring a light signal through an optical fiber, the optical communications module having a light signal transmission capability, wherein the optical communications module comprising:
    a semiconductor laser;
    an optical fiber coupled to a front facet of the semiconductor laser;
    a light splitting element for splitting light which is emitted from the front facet of the semiconductor laser and propagated within the optical fiber;
    an output-monitoring photodiode for receiving a portion of the light which has been split by the light splitting element as monitoring light, and generating a photocurrent based on the monitoring light, the photocurrent being used for controlling optical output of the semiconductor laser; and
    an optical fiber-embedding type optical circuit the optical fiber-embedding type optical circuit comprising the optical fiber being embedded in an optical fiber-embedding substrate;
    wherein the light splitting element comprises a half mirror which is inserted in the optical fiber-embedding substrate at an angle with respect to a central axis of the optical fiber, the half mirror lying in an optical path within the optical fiber,
    wherein the output-monitoring photodiode is mounted on an upper face of the optical fiber-embedding substrate,
    wherein the monitoring light is reflected by the half mirror so as to be received by the output-monitoring photodiode, and
    wherein the half mirror has a reflectance in a range of about 5% to about 15% with respect to an emission wavelength of the semiconductor laser.

11. An optical communications module according to claim 10, further comprising a high reflectance film on a rear facet of the semiconductor laser and wherein the semiconductor laser is a laser device selected from a group consisting of narrow divergence angle laser devices and spot size conversion laser devices.

12. An optical communications nodule according to claim 10, further comprising a high reflectance film on a rear facet of the semiconductor laser and wherein the semiconductor laser comprises a DFB laser device.

13. An optical communications module according to claim 10, further comprising a high reflectance film on a rear facet of the semiconductor laser and wherein the semiconductor laser is a high power laser device for use as a pump light source.

14. An optical communications module for use in an optical transfer system for bidirectionally transferring a light through an optical fiber, the optical communications module having a light signal transmission capability, wherein the optical communications module comprises:
    a semiconductor laser,
    an optical fiber coupled to a front facet of the semiconductor laser,
    a light splitting element for splitting light which is emitted from the front facet of the semiconductor laser and propagated within the optical fiber;

an output-monitoring photodiode for receiving a portion of the light which has been split by the light splitting element as monitoring light, and generating a photocurrent based on the monitoring light, the photocurrent being used for controlling optical output of the semiconductor laser; and an optical fiber-embedding type optical circuit, the optical fiber-embedding type optical circuit comprising the optical fiber being embedded in an optical fiber-embedding substrate, wherein an interspace between the optical fiber-embedding substrate and a light-receiving face of the output-monitoring photodiode is substantially filled with a resin whose refractive index is matched with a refractive index of a material comprising the fiber embedding substrate, and wherein the light splitting element comprises a half mirror which is inserted in the optical fiber-embedding substrate at an angle with respect to a central axis of the optical fiber, the half mirror lying in an optical path within the optical fiber.

15. An optical communications module according to claim 14, further comprising a high reflectance film on a rear facet of the semiconductor laser and wherein the semiconductor laser is a laser device selected from a group consisting of narrow divergence angle laser devices and spot size conversion laser devices.

16. An optical communications module according to claim 14, further comprising a high reflectance film on a rear facet of the semiconductor laser and wherein the semiconductor laser comprises a DFB laser device.

17. An optical communications module according to claim 14, further comprising a high reflectance film on a rear facet of the semiconductor laser and wherein the semiconductor laser is a high power laser device for use as a pump light source.

18. An optical communications module for use in an optical transfer system for bidirectionally transferring a light signal through an optical fiber, the optical communications module having a light signal transmission capability, wherein the optical communications module comprises:

a semiconductor laser;

an optical fiber coupled to a front facet of the semiconductor laser;

a light splitting element for splitting light which is emitted from the front facet of the semiconductor laser and propagated within the optical fiber;

an output-monitoring photodiode for receiving a portion of the light which has been split by the light splitting element as monitoring light, and generating a photocurrent based on the monitoring light, the photocurrent being used for controlling optical output of the semiconductor laser;

an optical fiber-embedding type optical circuit, the optical fiber-embedding type optical circuit comprising the optical fiber being embedded in an optical fiber-embedding substrate; and an antireflective film with respect to an emission wavelength of the semiconductor laser in a light-incidence region of a light-incidence face of the output-monitoring photodiode, wherein the light splitting element comprises a half mirror which is inserted in the optical fiber-embedding substrate at an angle with respect to a central axis of the optical fiber, the half mirror lying in an optical path within the optical fiber.

19. An optical communications module according to claim 18, further comprising a high reflectance film on a rear facet of the semiconductor laser and wherein the semiconductor laser is a laser device selected from a group consisting of narrow divergence angle laser devices and spot size conversion laser devices.

20. An optical communications module according to claim 18, further comprising a high reflectance film on a rear face of the semiconductor laser and wherein the semiconductor laser comprises a DFB laser device.

21. An optical communications module according to claim 18, further comprising a high reflectance film on a rear facet of the semiconductor laser and wherein the semiconductor laser is a high power laser device for use as a pump light source.

22. An optical communications module for use in an optical transfer system for bidirectionally transferring a light signal through an optical fiber, the optical communications module having a light signal transmission capability, wherein the optical communications module comprises:

a semiconductor laser;

an optical fiber coupled to a front facet of the semiconductor laser;

a light splitting element for splitting light which is emitted from the front of the semiconductor laser and propagated within the optical fiber;

an output-monitoring photodiode for receiving a portion of the light which has been split by the light splitting element as monitoring light, and generating a photocurrent based on the monitoring light, the photocurrent being used for controlling optical of the semiconductor laser;

an optical fiber-embedding type optical circuit, the optical fiber-embedding type optical circuit comprising the optical fiber being embedded in an optical fiber-embedding substrate; and a metal light-shielding film an a surface of the output-monitoring photodiode in regions except for a light-receiving region and a light-incidence region for allowing incident light to pass through, wherein the light splitting element comprises a half mirror which is inserted in the optical fiber-embedding substrate at an angle with respect to a central axis of the optical fiber, the half mirror lying in an optical path within the optical fiber.

23. An optical communications module according to claim 22, further comprising a high reflectance film on a rear facet of the semiconductor laser and wherein the semiconductor laser is a laser device selected from a group consisting of narrow divergence angle laser devices and spot size conversion laser devices.

24. An optical communications module according to claim 22, further comprising a high reflectance film on a rear facet of the semiconductor laser and wherein the semiconductor laser comprises a DFB laser device.

25. An optical communications module according to claim 22, further comprising a high reflectance film on a rear facet of the semiconductor laser and wherein the semiconductor laser is a high power laser device for use as a pump light source.

26. An optical communications module for use in an optical transfer system for bidirectionally transferring a light signal through an optical fiber, the optical communications module having a light signal transmission capability, wherein the optical communications module comprises:

a semiconductor laser;

an optical fiber coupled to a front facet of the semiconductor laser;

a light splitting element for splitting light which is emitted from the facet of the semiconductor laser and propagated within the optical fiber;

an output-monitoring photodiode for receiving a portion of the light which has been split by the light splitting element as monitoring light, and generating a photocurrent based on the monitoring light, the photocurrent being used for controlling optical output of the semiconductor laser;

an optical fiber-embedding type optical circuit, the optical fiber-embedding type optical circuit comprising the optical fiber being embedded in an optical fiber-embedding substrate; and a light-shielding resin substantially covering facets other than upper face and a bottom face of the output-monitoring photodiode, wherein the light splitting element comprises a half mirror which is inserted in the optical fiber-embedding substrate at an angle with respect to a central axis of the optical fiber, the half mirror lying in an optical path within the optical fiber.

27. An optical communications module according to claim 26, further comprising a high reflectance film on a rear facet of the semiconductor laser and wherein the semiconductor laser is a laser device selected from a group consisting of narrow divergence angle laser devices and spot size conversion laser devices.

28. An optical communications module according to claim 26, further comprising a high reflectance film an a rear facet of the semiconductor laser and wherein the semiconductor laser comprises a DFB laser device.

29. An optical communications module according to claim 26, further comprising a high reflectance film on a rear facet of the semiconductor laser and wherein the semiconductor laser is a high power laser device for us as a pump light source.

* * * * *